(12) United States Patent
Chou

(10) Patent No.: US 11,044,142 B2
(45) Date of Patent: Jun. 22, 2021

(54) PERFORMANCE MONITORING TECHNIQUES FOR VIRTUALIZED RESOURCES

(71) Applicant: APPLE INC., Cupertino, CA (US)

(72) Inventor: Joey Chou, Scottsdale, AZ (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/060,912

(22) PCT Filed: Oct. 1, 2016

(86) PCT No.: PCT/US2016/055071
§ 371 (c)(1),
(2) Date: Jun. 8, 2018

(87) PCT Pub. No.: WO2017/119933
PCT Pub. Date: Jul. 13, 2017

(65) Prior Publication Data
US 2018/0367373 A1    Dec. 20, 2018

Related U.S. Application Data

(60) Provisional application No. 62/276,527, filed on Jan. 8, 2016, provisional application No. 62/276,489, filed on Jan. 8, 2016.

(51) Int. Cl.
*H04L 12/24* (2006.01)
*H04L 12/26* (2006.01)

(52) U.S. Cl.
CPC ...... *H04L 41/0672* (2013.01); *H04L 41/0631* (2013.01); *H04L 41/0681* (2013.01); *H04L 41/5009* (2013.01); *H04L 43/16* (2013.01)

(58) Field of Classification Search
CPC ............. H04L 41/0672; H04L 41/0631; H04L 41/0681; H04L 41/5009; H04L 43/16
See application file for complete search history.

(56) References Cited

U.S. PATENT DOCUMENTS

| 10,042,662 B1 * | 8/2018 | Marquardt | ............. G06F 21/53 |
| 2014/0295856 A1 * | 10/2014 | Chou | ................... H04W 76/28 |
|  |  |  | 455/446 |

(Continued)

FOREIGN PATENT DOCUMENTS

| WO | 2015106822 A1 | 7/2015 |
| WO | WO-2017092640 A1 * | 6/2017 |

OTHER PUBLICATIONS

3GPP TS 28.516, Fault Management (FM) for mobile networks that include virtualized network functions; V0.1.0 (Year: 2015).*

(Continued)

*Primary Examiner* — Un C Cho
*Assistant Examiner* — Peter K Mak
(74) *Attorney, Agent, or Firm* — Eschweiler & Potashnik, LLC

(57) ABSTRACT

Performance monitoring techniques for virtualized resources are described. In one embodiment, for example, an apparatus may comprise processing circuitry and computer-readable storage media having stored thereon instructions for execution by the processing circuitry to identify a virtualized network function (VNF)-related virtualized resource (VR) performance threshold for one or more VRs supporting a VNF used to implement a virtualized network element in a 3rd Generation Partnership Project (3GPP) network, determine whether the VNF-related VR performance threshold has been crossed based on received VNF-related VR performance data, and in response to a determination that the VNF-related VR performance threshold has been crossed, send a VNF-related VR performance alarm notification to an element manager (EM). Other embodiments are described and claimed.

24 Claims, 18 Drawing Sheets

(56) References Cited

U.S. PATENT DOCUMENTS

| | | | | |
|---|---|---|---|---|
| 2015/0109995 | A1* | 4/2015 | Mathai | H04L 61/301 |
| | | | | 370/328 |
| 2016/0330067 | A1* | 11/2016 | Liu | H04L 41/046 |
| 2016/0364226 | A1* | 12/2016 | Takano | G06F 8/65 |
| 2017/0012898 | A1* | 1/2017 | Zhu | H04L 12/6418 |
| 2017/0244596 | A1* | 8/2017 | Chen | H04L 12/1407 |
| 2017/0250870 | A1* | 8/2017 | Zhao | H04L 63/20 |
| 2017/0317872 | A1* | 11/2017 | Zhu | H04L 41/0618 |
| 2017/0346676 | A1* | 11/2017 | Andrianov | H04L 41/069 |
| 2018/0083850 | A1* | 3/2018 | Rabipour | H04L 43/022 |
| 2018/0191561 | A1* | 7/2018 | You | H04L 41/00 |
| 2018/0262389 | A1* | 9/2018 | Soderlund | H04L 41/0806 |

OTHER PUBLICATIONS

International Search Report for the International Application No. PCT/US16/55070, dated Jan. 4, 2017, 3 pages.
"Network Function Virtualization (NFV) Management and Orchestration; GS NFV-Man 001", ETSI Draft; GS NFV-MAN 001, European Telecommunications Standards Institute (ETSI), 650, Route Des Lucioles; F-06921 Sophia-Antipolis; France, vol. ISG-NFV, No. Vo. 6.3, Sep. 22, 2014 (Sep. 22, 2014), pp. 1-197, XP014216374, [retreived on Sep. 22, 2014] pp. 128-129, paragraph B.5.

* cited by examiner

400

500

600

*1300*

*1600*

_US 11,044,142 B2_

PERFORMANCE MONITORING TECHNIQUES FOR VIRTUALIZED RESOURCES

CROSS-REFERENCE TO RELATED APPLICATION CASE

This application is a national phase claiming the benefit of and priority to International Patent Application No. PCT/US16/55071, filed Oct. 1, 2016, which claims priority to U.S. Provisional Patent Application No. 62/276,527, filed Jan. 8, 2016, and U.S. Provisional Patent Application No. 62/276,489, filed Jan. 8, 2016, all of which are hereby incorporated by reference in their entireties.

TECHNICAL FIELD

Embodiments herein generally relate to the virtualization of nodes in communication networks.

BACKGROUND

In order to enhance the ability of a communication network to dynamically adapt to changes in network conditions, it may be desirable to implement a virtualization framework, which may enable the virtualization of one or more entities/nodes of that communication network. In the context of a 3rd Generation Partnership Project (3GPP) network, the implementation of a virtualization framework may enable the virtualization of various types of network elements, which may potentially include core network entities such as mobility management entities (MMEs), serving gateways (GWs), and packet data network (PDN) GWs and/or radio access network (RAN) entities such as evolved node Bs (eNBs). One example of a virtualization framework that may be implemented in order to enable the virtualization of network elements in a 3GPP network is the Network Functions Virtualization (NFV) framework defined by various group specifications (GSs) that are currently being developed by the NFV Industry Specification Group (ISG) of the European Telecommunications Standards Institute (ETSI).

DETAILED DESCRIPTION

Figure 1:
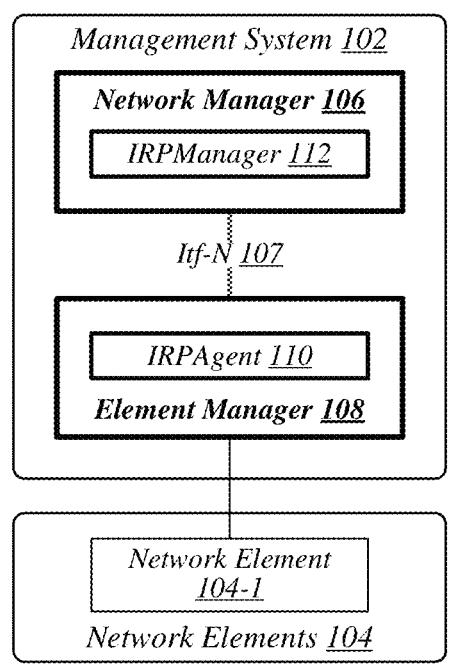
FIG. 1 illustrates an embodiment of a communications network.

Various embodiments may be generally directed to performance monitoring techniques for virtualized resources. In one embodiment, for example, an apparatus may comprise processing circuitry and computer-readable storage media having stored thereon instructions for execution by the processing circuitry to identify a virtualized network function (VNF)-related virtualized resource (VR) performance threshold for one or more VRs supporting a VNF used to implement a virtualized network element in a 3rd Generation Partnership Project (3GPP) network, determine whether the VNF-related VR performance threshold has been crossed based on received VNF-related VR performance data, and in response to a determination that the VNF-related VR performance threshold has been crossed, send a VNF-related VR performance alarm notification to an element manager (EM). Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE)

802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an example of a basic high-level system architecture of a 3GPP network 100 that may be representative of various embodiments. As reflected in FIG. 1, 3GPP network 100 may be implemented by configuring a management system 102 to manage a set of network elements 104. Network elements 104 may generally comprise various types of functional nodes possessing capabilities that collectively enable the provision of mobile services to end users. Examples of network elements 104 may include evolved node Bs (eNBs), mobility management entities (MMEs), serving gateways (GWs), packet data network (PDN) GWs, evolved packet gateways, local GWs, evolved packet data GWs (ePDGs), home subscriber servers (HSSs), 3GPP authentication, authorization, and accounting (AAA) servers, and access network discovery and selection function (ANDSF) entities. The embodiments are not limited to these examples.

Management system 102 may comprise a network manager 106. Network manager 106 may generally comprise an entity responsible for performing high-level oversight/management of the set of network elements 104 in such fashion as to enable 3GPP network 100 to operate appropriately according to establish parameters. In some embodiments, network manager 106 may be provided with managerial access to some or all of network elements 104 via one or more element managers. Each such element manager may generally comprise an entity that is response for controlling/managing one or more particular network elements among the set of network elements 104 of 3GPP network 100.

In the example depicted in FIG. 1, network manager 106 is provided with managerial access to a network element 104-1 via an element manager 108. In various embodiments, network manager 106 and element manager 108 may be configured to communicate with each other via an Itf-N interface 128. In some embodiments, element manager 108 may act as an Integration Reference Point (IRP) agent (IRPAgent) 110. In various embodiments, in conjunction with acting as IRPAgent 110, element manager 108 may provide one or more IRPs that are usable by network manager 106 to interact with element manager 108 in a fashion enabling managerial control over network element 104-1. In some embodiments, in order to make use of those IRPs to interact with element manager 108, network manager 106 may act as an IRP manager (IRPManager) 112. It is worthy of note that although FIG. 1 depicts IRPAgent 110 and IRPManager 112 as boxes within element manager 108 and network manager 106, respectively, this depiction is not intended to indicate that IRPAgent 110 and IRPManager 112 need necessarily constitute discrete components of element manager 108 and network manager 106. Rather, this depiction is merely intended to indicate that in various embodiments, network manager 106 and element manager 108 may operate in such fashion as to act as IRPManager 112 and IRPAgent 110, respectively. The embodiments are not limited in this context.

Figure 2:
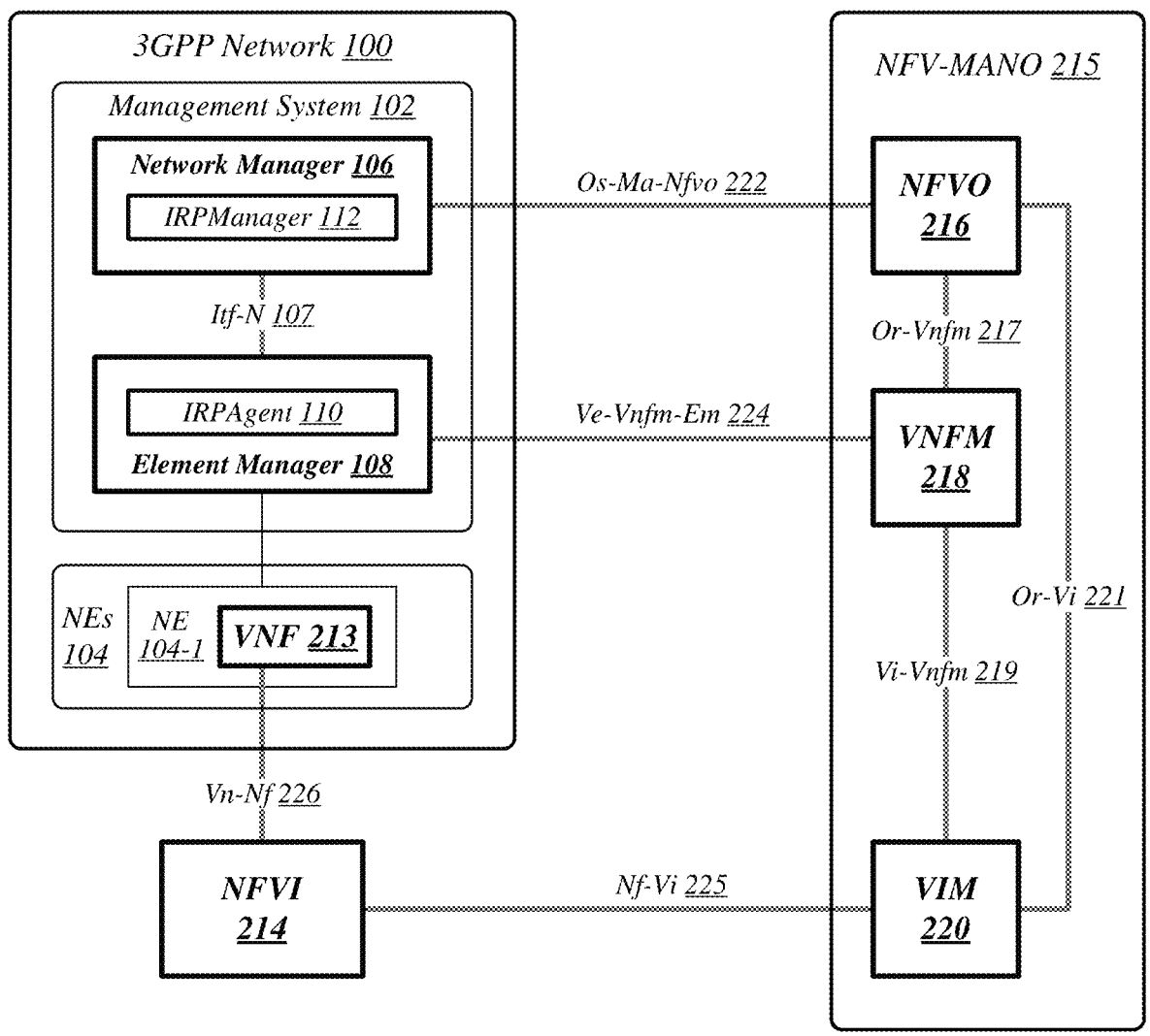
FIG. 2 illustrates an embodiment of a management architecture.

In various embodiments, due to a variety of potential factors, the numbers and/or types of network elements that are actually required to enable appropriate operation of 3GPP network 100 may tend to fluctuate over time. As such, it may be desirable that network function virtualization techniques be implemented for 3GPP network 100, such that the composition of the set of network elements 104 can be dynamically altered to adapt to changes in the demands placed on the system. FIG. 2 illustrates an example of a Network Functions Virtualization (NFV) management architecture 200 that may support the implementation of network function virtualization in 3GPP network 100 according to some embodiments. As shown in FIG. 2, NFV management architecture 200 may feature an NFV Infrastructure (NFVI) 214 and NFV Management and Orchestration (NFV-MANO) 215. NFVI 214 may generally comprise a pool of virtualized resources (VRs)—such as virtualized computing, storage, and networking resources—that is defined by the application of one or more abstraction layers to a pool of hardware resources, such as computing hardware, storage hardware, and networking hardware resources. NFV-MANO 215 may generally comprise a set of entities that collectively facilitate the instantiation, use, and management of virtualized network functions (VNFs), supported by VRs provided by NFVI 214. In the example depicted in FIG. 2, VRs of NFVI 214 are allocated for a VNF 213, which is used to implement network element 104-1. The embodiments are not limited to this example.

In various embodiments, NFV-MANO 215 may comprise NFV Orchestrator (NFVO) 216. NFVO 216 may generally comprise an entity responsible for performing high-level oversight/management of the use of VRs of NFVI 214 to support virtualized network functions—such as VNF 213—that are utilized to implement network elements of 3GPP network 100. In some embodiments, NFV-MANO 215 may include a Virtualized Network Functions Manager (VNFM) 218 that generally comprises an entity particularly responsible for management of VNF 213. In various embodiments, VNFM 218 may only be responsible for managing VNF 213. In some other embodiments, VNFM 218 may be responsible for managing one or more other VNFs (not pictured) in addition to VNF 213. In various embodiments, VNFM 218 and NFVO 216 may be configured to communicate with each other via an Or-Vnfm interface 217. In some embodiments, NFV-MANO 215 may comprise Virtualized Infrastructure Manager (VIM) 220. VIM 220 may generally comprise an entity responsible for control and management of VRs of NFVI 214. In various embodiments, VIM 220 and VNFM 218 may be configured to communicate with each other via a Vi-Vnfm interface 219. In some embodiments, VIM 220 and NFVO 216 may be configured to communicate with each other via an Or-Vi interface 221.

In various embodiments, network manager 106 and NFVO 216 may be configured to communicate with each other via an Os-Ma-Nfvo interface 222. In some embodiments, element manager 108 and VNFM 218 may be configured to communicate with each other via a Ve-Vnfm-Em interface 224. In various embodiments, NFVI 214 and VIM 220 may be configured to communicate with each other via an Nf-Vi interface 225. In some embodiments, VNF 213 and NFVI 214 may be configured to communicate with each other via a Vn-Nf interface 226.

To the extent that network elements of 3GPP network 100 are implemented using VNFs such as VNF 213, the reliability and service quality provided by those network elements—and by 3GPP network 100 as a whole—may depend on the performance of VRs of NFVI 214 that support those VNFs. In order to enhance service quality and reliability and enable timely detection and correction of network element failure conditions in 3GPP network 100, it may be desirable to implement a scheme for monitoring the performance of the VRs of NFVI 214 that are used to support the virtualization of network elements of 3GPP network 100.

Figure 3:
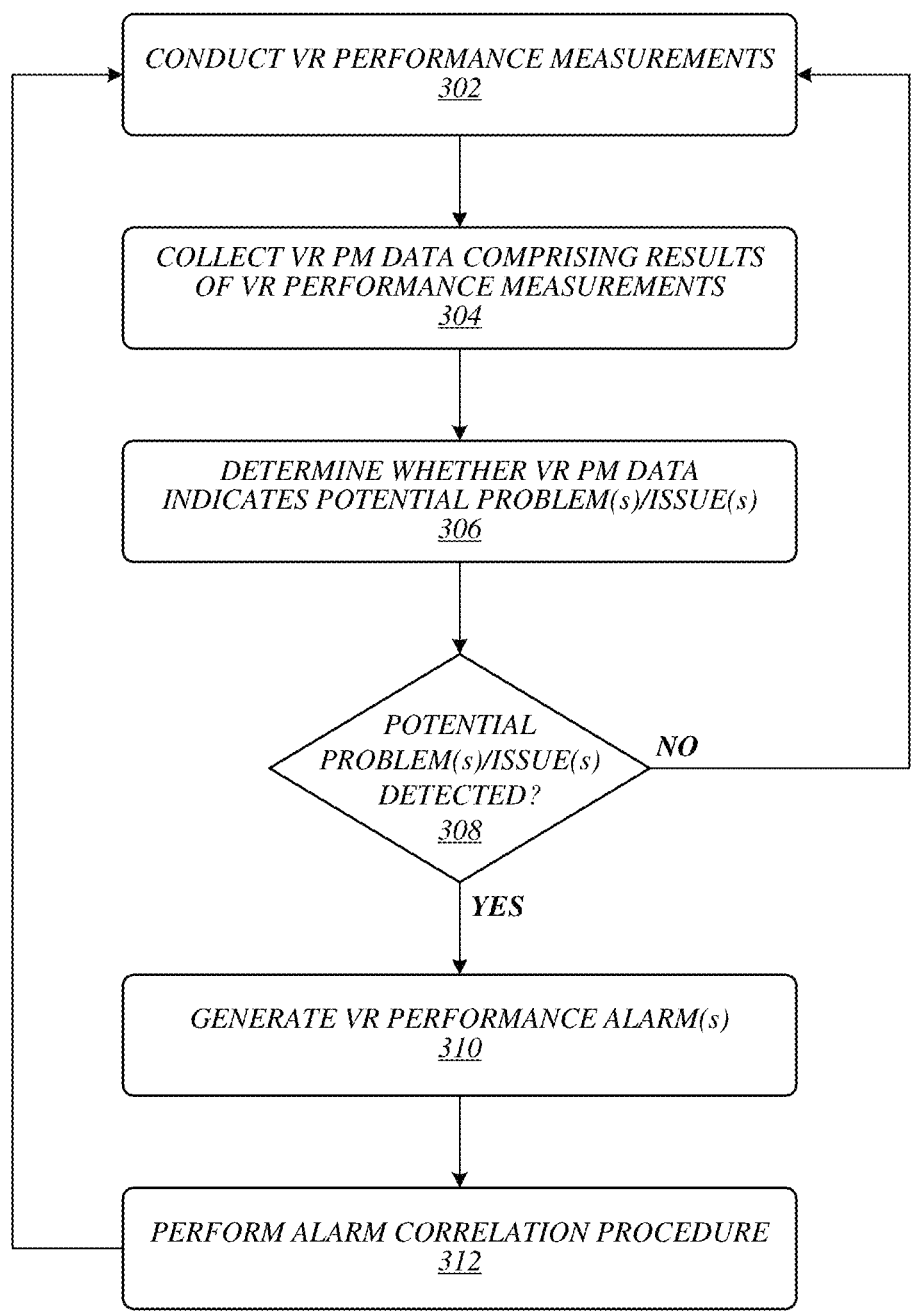
FIG. 3 illustrates an embodiment of a monitoring scheme.

FIG. 3 illustrates an example of a monitoring scheme 300 that may be implemented in various embodiments for a network—such as 3GPP network 100—that includes virtualized network elements. According to monitoring scheme 300, VR performance measurements may be conducted at 302. These VR performance measurements may generally comprise measurements of the performance and/or usage of VRs of an NFVI, such as NFVI 214. At 304, VR performance measurement (PM) data may be collected that comprises the results of VR performance measurements conducted at 302. At 306, the VR PM data may be analyzed to determine whether it indicates any potential problems or issues with respect to the VRs subject to the VR performance measurements conducted at 302. From 306, flow may pass to 308, from which it may proceed in a manner depending on the outcome of the determination performed at 306.

If one or more problems/issues were detected via the analysis at 306, flow may pass from 308 to 310. At 310, one or more VR performance alarms may be generated based on the detection at 306 of one or more problems/issues with respect to the subject VRs. At 312, an alarm correlation procedure may be performed. The alarm correlation procedure may generally involve checking for correlations between a set of generated alarms. With respect any particular one of the one or more VR performance alarms generated at 310, the alarm correlation procedure may generally involve checking for correlations between that VR performance alarm and each of one or more other pending alarms. In some embodiments, the one or more other pending alarms may include one or more other VR performance alarms. In various embodiments, the one or more other pending alarms may include one or more other types of alarms. In an example embodiment, the one or more other pending alarms may include one or more alarms associated with VNF applications that run on virtualized resources for which the one or more VR performance alarms were generated. Such VNF applications may correspond to virtualized network elements such as virtualized evolved node Bs (veNBs), virtualized mobility management entities (vMMEs), virtualized serving gateways (vSGWs), and/or virtualized packet data network (PDN) gateways (vPGWs), for instance. In some embodiments, performing the alarm correlation procedure to detect correlations between alarms may enable identification of the root cause(s) of problem(s)/issue(s) that arise with respect to the VRs of NFVI 214 and/or VNF 213. The identification of such root cause(s) may in turn enable the determination of appropriate corrective actions to be taken. From 312, flow may return to 302, where another set of VR performance measurements may subsequently be conducted. If the analysis of the VR PM data at 306 did not detect any problems or issues, flow may return to 302 directly from 308. The embodiments are not limited in this context.

Figure 4:
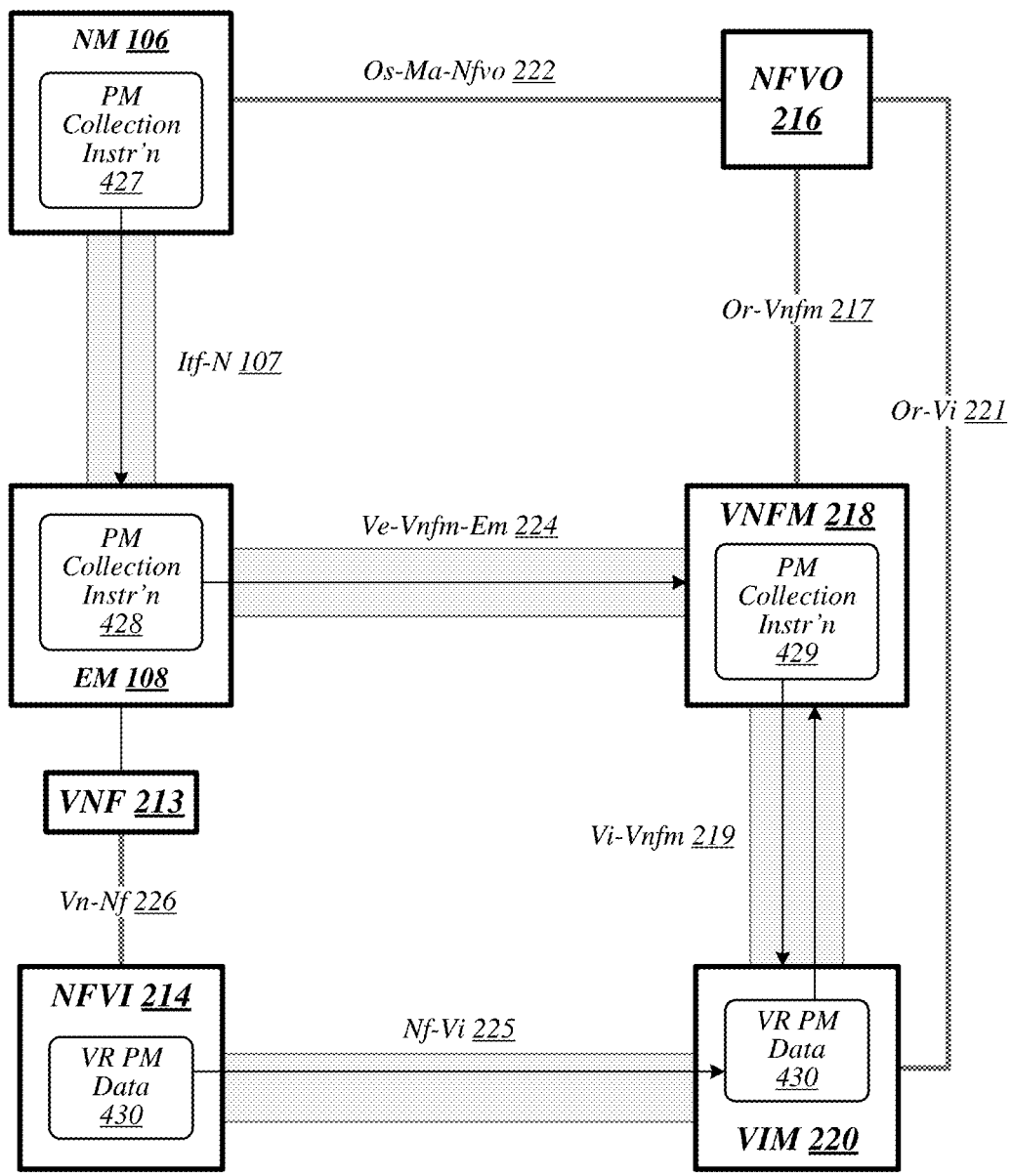
FIG. 4 illustrates an embodiment of a first operating environment.

FIG. 4 illustrates an example of an operating environment 400 that may be representative of the implementation of a monitoring scheme such as monitoring scheme 300 of FIG. 3 according to various embodiments. In operating environment 400, in accordance with such a monitoring scheme, VR performance measurements may be conducted in order to measure the performance and/or usage of VRs of NFVI 214. In some embodiments, in order to effect the execution of such VR performance measurements, network manager 106 may send PM collection instructions 427 to element manager 108. In various embodiments, network manager 106 may send PM collection instructions 427 to element manager 108 via Itf-N interface 107. In some embodiments, sending PM collection instructions 427 to element manager 108 may cause a PM collection job to be created at element manager 108. In various embodiments, the creation of the PM collection job at element manager 108 may cause element manager 108 to send PM collection instructions 428 to VNFM 218, which may cause a corresponding PM collection job to be created at VNFM 218. In some embodiments, element manager 108 may send PM collection instructions 428 to VNFM 218 via Ve-Vnfm-Em interface 224. In various embodiments, the creation of the PM collection job at VNFM 218 may cause VNFM 218 to send PM collection instructions 429 to VIM 220, which may cause a corresponding PM collection job to be created at VIM 220. In some embodiments, VNFM 218 may send PM collection instructions 429 to VIM 220 via Vi-Vnfm interface 219.

In various embodiments, network manager 106 may include in PM collection instructions 427 one or more job parameters describing aspects of the PM collection job to be performed. In some embodiments, element manager 108 may include corresponding job parameters in PM collection instructions 428, and VNFM 218 may include corresponding job parameters in PM collection instructions 429. In various embodiments, the one or more job parameters may include one or more parameters indicating one or more types of measurements to be performed in conjunction with the PM collection job. In some embodiments, the one or more job parameters may include one or more parameters indicating one or more resources for which performance measurements are to be collected in conjunction with the PM collection job. In various embodiments, the one or more job parameters may include one or more parameters indicating one or more time intervals for which performance measurements are to be collected in conjunction with the PM collection job. The embodiments are not limited to these examples.

In some embodiments, the creation of the PM collection job at VIM 220 may cause VIM 220 to collect VR PM data 430 from NFVI 214. VR PM data 430 may generally comprise data indicating the results of conducted measurements of the performance and/or usage of one or more virtualized resources of NFVI 214. In various embodiments, VR PM data 430 may include data indicating results of conducted measurements of the performance and/or usage of one or more hardware resources of NFVI 214 that underlie virtualized resources used by VNFs such as VNF 213. In some embodiments, VR PM data 430 may generally be descriptive of measurements performed during a particular time interval, which may be referred to as the "PM interval" associated with VR PM data 430. In various embodiments, network manager 106 may specify the PM interval by setting the value of a parameter included in PM collection instructions 427. In some embodiments, the completion of the collection of VR PM data 430 by VIM 220 in operating environment 400 may generally correspond to the completion of the collection of VR PM data at 304 according to monitoring scheme 300 of FIG. 3. In various embodiments, once it has completed the collection of VR PM data 430, VIM 220 may forward VR PM data 430 to VNFM 218. In some embodiments, VIM 220 may forward VR PM data 430 to VNFM 218 via Vi-Vnfm interface 219. The embodiments are not limited in this context.

Figure 5:
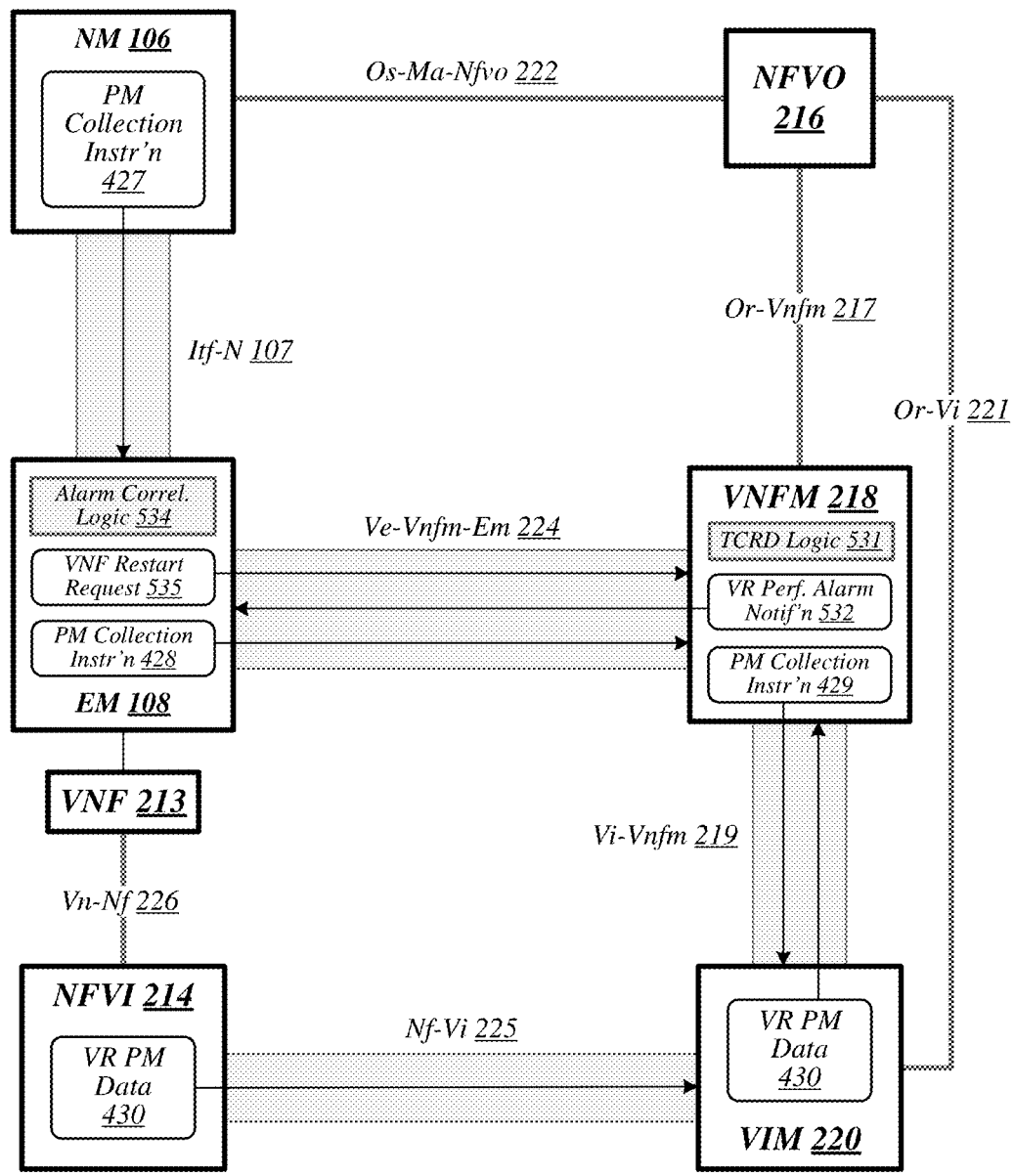
FIG. 5 illustrates an embodiment of a second operating environment.

FIG. 5 illustrates an example of an operating environment 500 that may be representative of the implementation of a monitoring scheme such as monitoring scheme 300 of FIG. 3 according to various embodiments. In operating environment 500, VNFM 218 may be responsible for checking VR PM data 430 and generating VR performance alarms based on any detected problems or issues. Operations that VNFM 218 performs in this context may generally correspond to operations that may be performed at 306, 308, and 310 according to monitoring scheme 300 of FIG. 3 according to some embodiments. Element manager 108 may be tasked with checking for correlations between VR performance alarms generated by VNFM 218 and other alarms. Operations that element manager 108 performs in this context may generally correspond to operations that may be performed at 312 according to monitoring scheme 300 of FIG. 3 according to various embodiments. The embodiments are not limited in this context.

In some embodiments, as shown in FIG. 5, VNFM 218 may be configured with threshold crossing/reaching detection (TCRD) logic 531 for use in order to apply a TCRD algorithm. Applying such a TCRD algorithm may generally involve checking VR PM data 430 for indications of problems/issues based on a set of one or more threshold values defined for measurements of the type(s) represented in VR PM data 430. In various embodiments, applying the TCRD algorithm may involve determining whether VR PM data 430 contains VR PM values that cross or reach any of the set of one or more defined threshold values.

In some embodiments, in response to a determination that VR PM data 430 indicates that a threshold value has been crossed or reached, VNFM 218 may generate a VR performance alarm. In various embodiments, VNFM 218 may notify element manager 108 of the VR performance alarm by sending a VR performance alarm notification 532 to element manager 108. In some embodiments, VNFM 218 may send VR performance alarm notification 532 to element manager 108 via Ve-Vnfm-Em interface 224. In various embodiments, VR performance alarm notification 532 may contain information identifying one or more VRs to which the VR performance alarm applies. In some embodiments, VR performance alarm notification 532 may contain information identifying a type of measurement for which the associated threshold value has been crossed or reached. It is to be appreciated that other types of information may additionally or alternatively be comprised in VR performance alarm notification 532 in various embodiments, and the embodiments are not limited to these examples.

In some embodiments, in response to a determination that VR PM data 430 indicates that a threshold value has been crossed or reached, VNFM 218 may generate a VR performance data threshold crossing notification. In various embodiments, VNFM 218 may notify element manager 108 of the VR performance alarm by sending a VR performance data threshold crossing notification to element manager 108. In some embodiments, VNFM 218 may send VR performance data threshold crossing notification to element manager 108 via Ve-Vnfm-Em interface 224. In various embodiments, VR performance data threshold crossing notification may contain information identifying one or more VRs with respect to which the VR performance data threshold has been crossed. In some embodiments, such a VR performance data threshold crossing notification may contain information identifying a type of measurement for which the associated threshold value has been crossed or reached. It is to be appreciated that other types of information may additionally or alternatively be comprised in such a VR performance data threshold crossing notification in various embodiments, and the embodiments are not limited to these examples.

In some embodiments, element manager 108 may be configured with alarm correlation logic 534 for use in conjunction with performing an alarm correlation procedure. In various embodiments, based on receipt of VR performance alarm notification 532, element manager 108 may detect the VR performance alarm generated by VNFM 218 and initiate the alarm correlation procedure to check for correlations between that VR performance alarm and one or more other alarms. In some embodiments, the one or more other alarms may include one or more VNF application alarms. In various embodiments, the one or more other alarms may include one or more other VR performance alarms. In some embodiments, via the alarm correlation procedure, element manager 108 may detect that the VR performance alarm associated with VR performance alarm notification 532 is correlated with one or more of the one or more other alarms. In various embodiments, element manager 108 may determine that a VNF instance affected by problem(s)/issue(s) indicated by the correlated alarms should be restarted due to those problem(s)/issue(s). In some embodiments, element manager 108 may send a VNF restart request 535 to VNFM 218 in order to request that the VNF instance be reset. In various embodiments, element manager 108 may send VNF restart request 535 to VNFM 218 via Ve-Vnfm-Em interface 224. The embodiments are not limited in this context.

Figure 6:
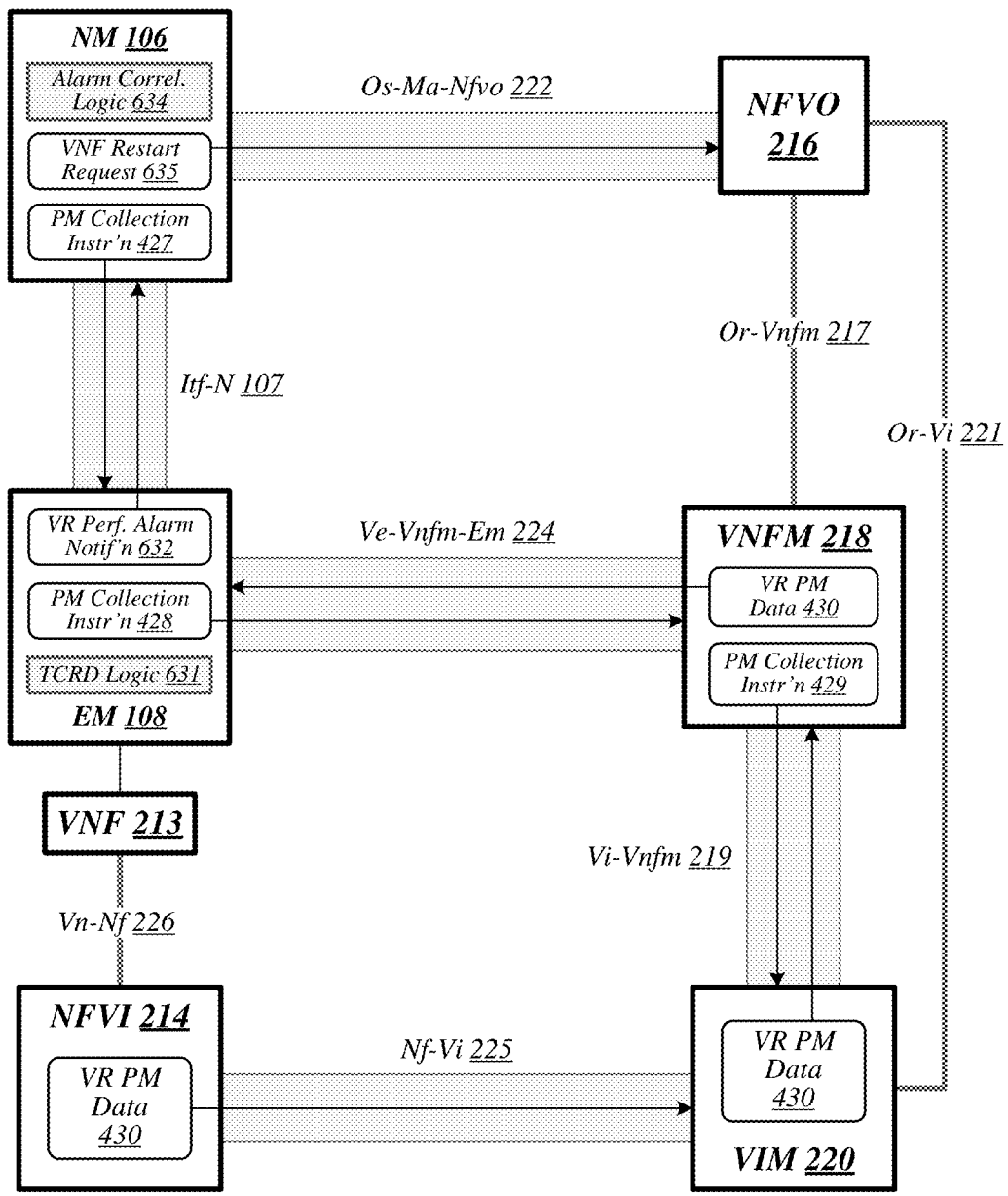
FIG. 6 illustrates an embodiment of a third operating environment.

FIG. 6 illustrates an example of an operating environment 600 that may be representative of the implementation of a monitoring scheme such as monitoring scheme 300 of FIG.

3 according to some embodiments. In operating environment 600, rather than checking VR PM data 430 itself, VNFM 218 may forward VR PM data 430 to element manager 108, which may be responsible for checking VR PM data 430 and generating VR performance alarms based on any detected problems or issues. Operations that element manager 108 performs in this context may generally correspond to operations that may be performed at 306, 308, and 310 according to monitoring scheme 300 of FIG. 3 according to various embodiments. Network manager 106 may be tasked with checking for correlations between VR performance alarms generated by element manager 108 and other alarms. Operations that network manager 106 performs in this context may generally correspond to operations that may be performed at 312 according to monitoring scheme 300 of FIG. 3 according to some embodiments. The embodiments are not limited in this context.

In various embodiments, as shown in FIG. 6, element manager 108 may be configured with TRCD logic 631 for use in order to apply a TCRD algorithm. Applying such a TCRD algorithm may generally involve checking VR PM data 430 for indications of problems/issues based on a set of one or more threshold values defined for measurements of the type(s) represented in VR PM data 430. In some embodiments, applying the TCRD algorithm may involve determining whether VR PM data 430 contains VR PM values that cross or reach any of the set of one or more defined threshold values.

In various embodiments, in response to a determination that VR PM data 430 indicates that a threshold value has been crossed or reached, element manager 108 may generate a VR performance alarm. In some embodiments, element manager 108 may notify network manager 106 of the VR performance alarm by sending a VR performance alarm notification 632 to network manager 106. In various embodiments, element manager 108 may send VR performance alarm notification 632 to network manager 106 via Itf-N interface 107. In some embodiments, VR performance alarm notification 632 may contain information identifying one or more VRs to which the VR performance alarm applies. In various embodiments, VR performance alarm notification 632 may contain information identifying a type of measurement for which the associated threshold value has been crossed or reached. It is to be appreciated that other types of information may additionally or alternatively be comprised in VR performance alarm notification 632 in some embodiments, and the embodiments are not limited to these examples. In various embodiments, element manager 108 may act as IRPAgent 110 of FIGS. 1 and 2 in conjunction with sending VR performance alarm notification 632 to network manager 106. In some embodiments, network manager 106 may act as IRPManager 112 of FIGS. 1 and 2 in conjunction with receiving VR performance alarm notification 632 from element manager 108. The embodiments are not limited in this context.

In various embodiments, network manager 106 may be configured with alarm correlation logic 634 for use in conjunction with performing an alarm correlation procedure. In some embodiments, based on receipt of VR performance alarm notification 632, network manager 106 may detect the VR performance alarm generated by element manager 108 and initiate the alarm correlation procedure to check for correlations between that VR performance alarm and one or more other alarms. In various embodiments, the one or more other alarms may include one or more VNF application alarms. In some embodiments, the one or more other alarms may include one or more other VR performance alarms. In various embodiments, via the alarm correlation procedure, network manager 106 may detect that the VR performance alarm associated with VR performance alarm notification 632 is correlated with one or more of the one or more other alarms. In some embodiments, network manager 106 may determine that a VNF instance affected by problem(s)/issue(s) indicated by the correlated alarms should be restarted due to those problem(s)/issue(s). In various embodiments, network manager 106 may send a VNF restart request 635 to NFVO 216 in order to request that the VNF instance be reset. In some embodiments, network manager 106 may send VNF restart request 635 to NFVO 216 via Os-Ma-Nfvo interface 222. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 7:
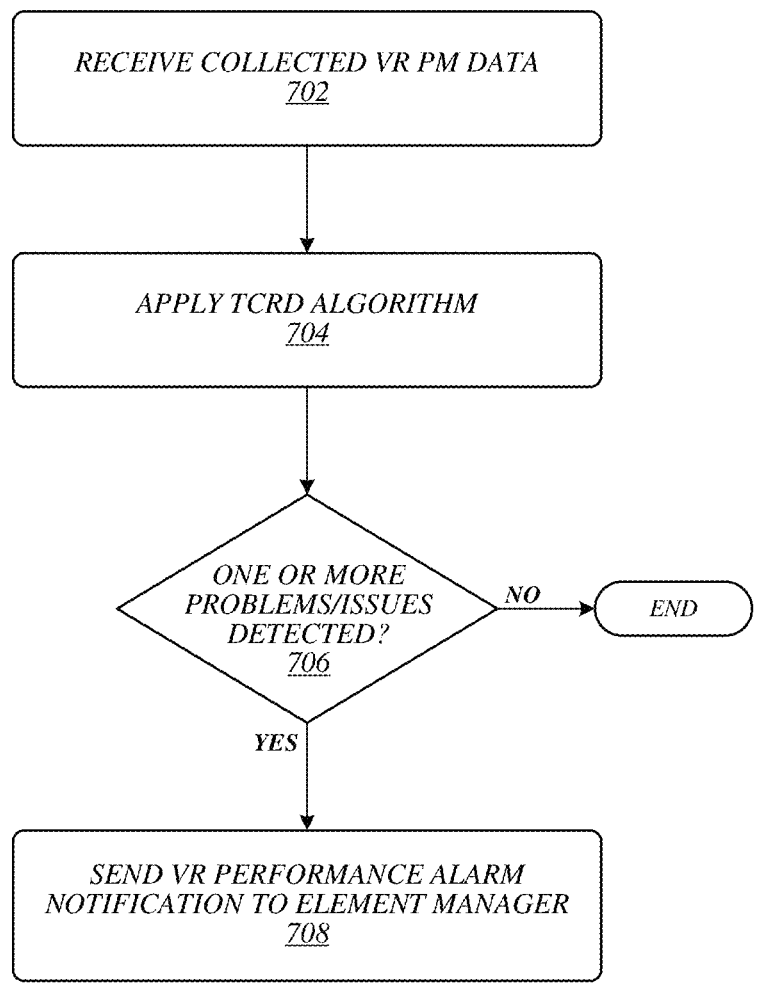
FIG. 7 illustrates an embodiment of a first logic flow.

FIG. 7 illustrates an example of a logic flow 700 that may be representative of the implementation of one or more of the disclosed techniques according to some embodiments. For example, logic flow 700 may be representative of operations that VNFM 218 may perform in operating environment 500 of FIG. 5 according to various embodiments. As shown in FIG. 7, collected VR PM data may be received at 702. For example, in operating environment 500 of FIG. 5, VNFM 218 may receive VR PM data 430 from VIM 220 via Vi-Vnfm interface 219. At 704, a TCRD algorithm may be applied, which may involve determining whether the collected VR PM data contains VR PM values that cross or reach any of a set of one or more defined thresholds. For example, in operating environment 500 of FIG. 5, VNFM 218 may use TCRD logic 531 to determine whether VR PM data 430 contains any values that cross or reach any of one or more defined thresholds. From 704, flow may pass to 706, from which it may proceed in a manner depending on the results at 704. If application of the TCRD algorithm at 704 did not result in the detection of any problems or issues, the logic flow may end. If application of the TCRD algorithm at 704 resulted in the detection of one or more problems/issues, flow may pass from 706 to 708. At 708, a VR performance alarm notification may be sent to an element manager. For example, in operating environment 500 of FIG. 5, VNFM 218 may send VR performance alarm notification 532 to element manager 108. The embodiments are not limited to these examples.

Figure 8:
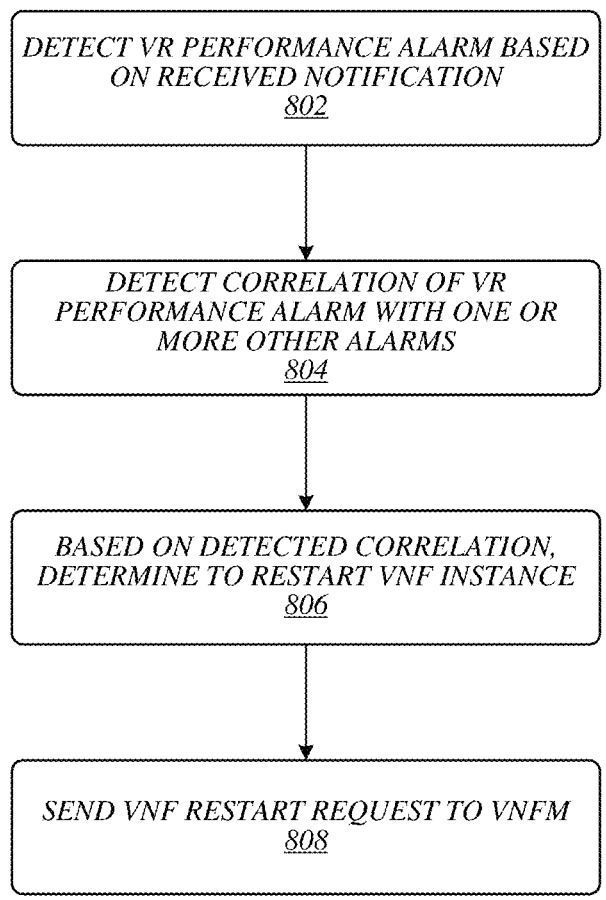
FIG. 8 illustrates an embodiment of a second logic flow.

FIG. 8 illustrates an example of a logic flow 800 that may be representative of the implementation of one or more of the disclosed techniques according to some embodiments. For example, logic flow 800 may be representative of operations that element manager 108 may perform in operating environment 500 of FIG. 5 according to some embodiments. As shown in FIG. 8, a VR performance alarm may be detected at 802 based on a received notification. For example, in operating environment 500 of FIG. 5, element manager 108 may detect a VR performance alarm based on a VR performance alarm notification 532 received from VNFM 218. At 804, a correlation of the VR performance alarm with one or more other alarms may be detected. For example, in operating environment 500 of FIG. 5, element manager 108 may detect that a VR performance alarm associated with VR performance alarm notification 532 is correlated with one or more other alarms. At 806, based on the detected correlation, it may be determined that a VNF instance is to be restarted. For example, in operating environment 500 of FIG. 5, element manager 108 may determine that VNF 213 is to be restarted based on a correlation of one or more other alarms with the VR performance alarm associated with VR performance alarm notification 532. At 808, a VNF restart request may be sent to a VNFM in order to request that the VNF instance be restarted. For example, in operating environment 500 of FIG. 5, element manager 108 may send VNF restart request 535 to VNFM 218 in order to request that VNF 213 be restarted. The embodiments are not limited to these examples.

Figure 9:
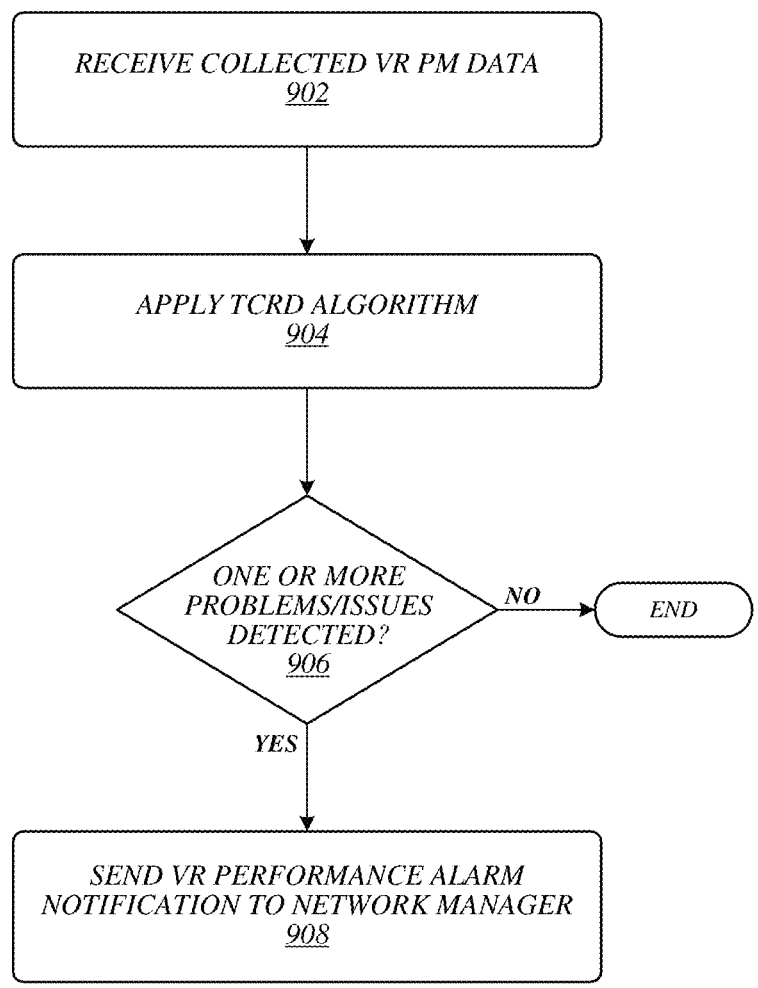
FIG. 9 illustrates an embodiment of a third logic flow.

FIG. 9 illustrates an example of a logic flow 900 that may be representative of the implementation of one or more of the disclosed techniques according to some embodiments. For example, logic flow 900 may be representative of operations that element manager 108 may perform in operating environment 600 of FIG. 6 according to various embodiments. As shown in FIG. 9, collected VR PM data may be received at 902. For example, in operating environment 600 of FIG. 6, element manager 108 may receive VR PM data 430 from VNFM 218 via Ve-Vnfm-Em interface 224. At 904, a TCRD algorithm may be applied, which may involve determining whether the received VR PM data contains VR PM values that cross or reach any of a set of one or more defined thresholds. For example, in operating environment 600 of FIG. 6, element manager 108 may use TCRD logic 631 to determine whether VR PM data 430 contains any values that cross or reach any of one or more defined thresholds. From 904, flow may pass to 906, from which it may proceed in a manner depending on the results at 904. If application of the TCRD algorithm at 904 did not result in the detection of any problems or issues, the logic flow may end. If application of the TCRD algorithm at 904 resulted in the detection of one or more problems/issues, flow may pass from 906 to 908. At 908, a VR performance alarm may be sent to a network manager. For example, in operating environment 600 of FIG. 6, element manager 108 may send VR performance alarm notification 632 to network manager 106. The embodiments are not limited to these examples.

Figure 10:
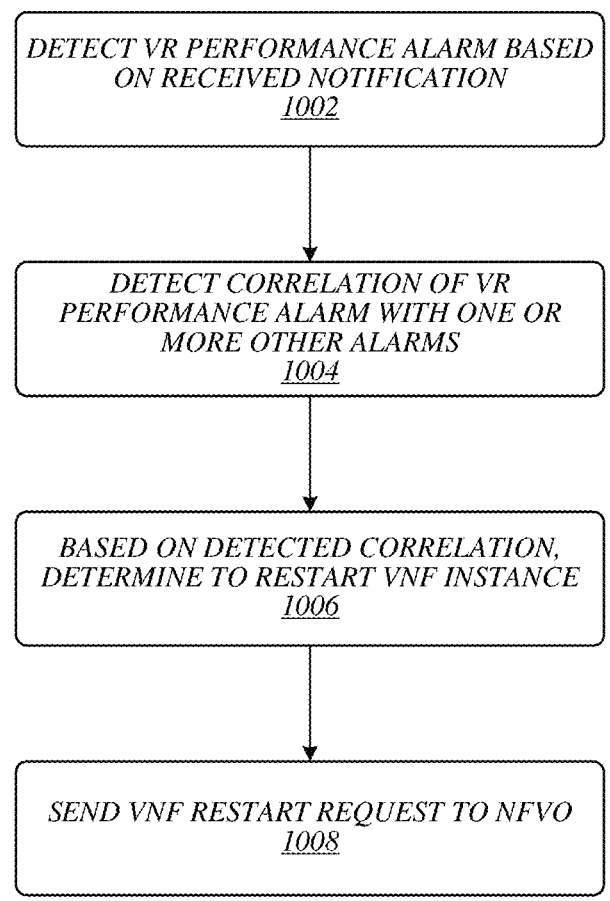
FIG. 10 illustrates an embodiment of a fourth logic flow.

FIG. 10 illustrates an example of a logic flow 1000 that may be representative of the implementation of one or more of the disclosed techniques according to some embodiments. For example, logic flow 1000 may be representative of operations that network manager 106 may perform in operating environment 600 of FIG. 6 according to some embodiments. As shown in FIG. 10, a VR performance alarm may be detected at 1002 based on a received notification. For example, in operating environment 600 of FIG. 6, network manager 106 may detect a VR performance alarm based on a VR performance alarm notification 632 received from element manager 108. At 1004, a correlation of the VR performance alarm with one or more other alarms may be detected. For example, in operating environment 600 of FIG. 6, network manager 106 may detect that a VR performance alarm associated with VR performance alarm notification 632 is correlated with one or more other alarms. At 1006, based on the detected correlation, it may be determined that a VNF instance is to be restarted. For example, in operating environment 600 of FIG. 6, network manager 106 may determine that VNF 213 is to be restarted based on a correlation of one or more other alarms with the VR performance alarm associated with VR performance alarm notification 632. At 1008, a VNF restart request may be sent to an NFVO in order to request that the VNF instance be restarted. For example, in operating environment 600 of FIG. 6, network manager 106 may send VNF restart request 635 to NFVO 216 in order to request that VNF 213 be restarted. The embodiments are not limited to these examples.

Figure 11:
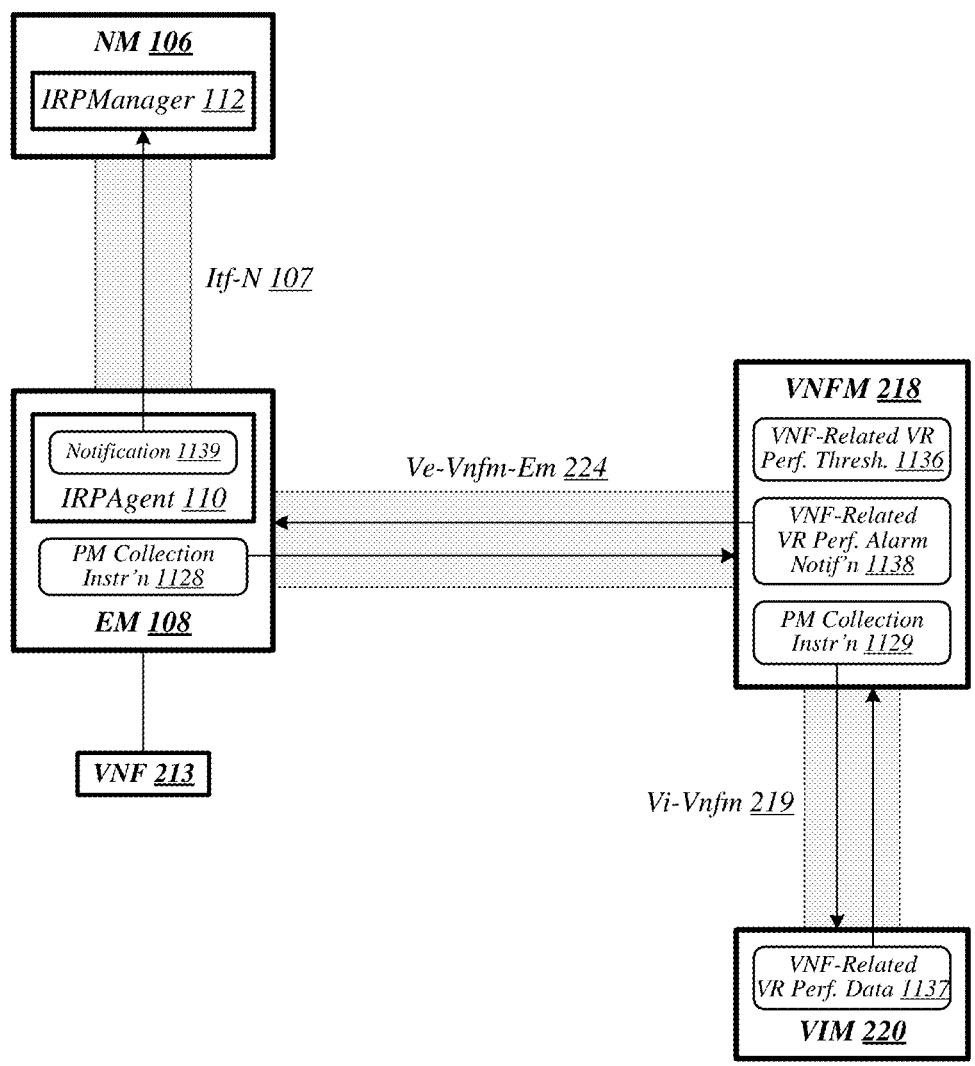
FIG. 11 illustrates an embodiment of a fourth operating environment.

FIG. 11 illustrates an example of an operating environment 1100 that may be representative of the implementation of one or more of the disclosed techniques according to various embodiments. In operating environment 1100, VNFM 218 may identify a VNF-related VR performance threshold 1136 and determine whether that VNF-related VR performance threshold 1136 has been reached or crossed based on received VNF-related VR performance data 1137. VNF-related VR performance data 1137 may generally comprise data characterizing one or more aspects of the performance of one or more VRs that support a particular VNF. For example, in some embodiments, VNF-related VR performance data 1137 may comprise data indicating the results of conducted measurements of the performance and/or usage of one or more VRs that support VNF 213. VNF-related VR performance threshold 1136 may generally comprise a value to be used as a benchmark in conjunction with assessing VNF-related VR performance data 1137 to determine whether it indicates any problems/issues with respect to the one or more VRs characterized by VNF-related VR performance data 1137. For example, in various embodiments, VNF-related VR performance threshold 1136 may comprise a value to be used as a benchmark in conjunction with assessing VNF-related VR performance data 1137 to determine whether it indicates any problems/issues with respect to one or more VRs that support VNF 213. The embodiments are not limited in this context.

In some embodiments, VNFM 218 may receive VNF-related VR performance data 1137 from VIM 220. In various embodiments, VNFM 218 may receive VNF-related VR performance data 1137 via Vi-Vnfm reference point 219. In some embodiments, VNFM 218 may send a message to VIM 220 in order to cause VIM 220 to collect VNF-related VR performance data 1137. In various embodiments, for example, VNFM 218 may send PM collection instructions 1129 to VIM 220 in order to cause VIM 220 to collect VNF-related VR performance data 1137. In some embodiments, VNFM 218 may send such a message in response to a request received from element manager 108. In various embodiments, for example, in response to PM collection instructions 1128 received from element manager 108, VNFM 218 may send PM collection instructions 1129 to VIM 220 in order to cause VIM 220 to collect VNF-related VR performance data 1137. In some embodiments, VNFM 218 may identify VNF-related VR performance threshold 1136 based on a message received from element manager 108. In various embodiments, for example, VNFM 218 may identify VNF-related VR performance threshold 1136 based on PM collection instructions 1128 received from element manager 108. The embodiments are not limited in this context.

In some embodiments, in response to a determination that VNF-related VR performance threshold 1136 has been crossed, VNFM 218 may send a VNF-related VR performance alarm notification 1138 to element manager 108. In various embodiments, VNFM 218 may send VNF-related VR performance alarm notification 1138 via Ve-Vnfm-Em reference point 224. In some embodiments, VNFM 218 may send VNF-related VR performance alarm notification 1138 in response to a determination that VNF-related VR performance threshold 1136 has been reached, without regard for whether VNF-related VR performance threshold 1136 has been crossed. In various other embodiments, in response to a determination that VNF-related VR performance threshold 1136 has been reached but has not been crossed, VNFM 218 may determine not to send VNF-related VR performance alarm notification 1138. The embodiments are not limited in this context.

In some embodiments, element manager 108 may detect a VNF-related VR performance alarm based on receipt of VNF-related VR performance alarm notification 1138. In various embodiments, element manager 108 may send a notification 1139 in order to provide network manager 106 with notice of the detected VNF-related VR performance alarm. In some embodiments, element manager 108 may send notification 1139 via Itf-N reference point 107. In various embodiments, element manager 108 may send notification 1139 in conjunction with acting as IRPAgent 110. In some embodiments, network manager 106 may act as IRPManager 112 in conjunction with receiving notification 1139. The embodiments are not limited in this context.

Figure 12:
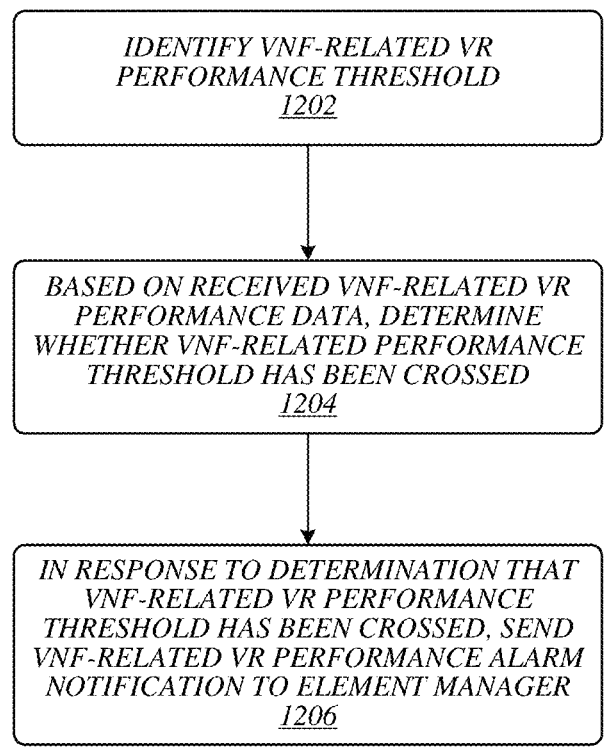
FIG. 12 illustrates an embodiment of a fifth logic flow.

FIG. 12 illustrates an example of a logic flow 1200 that may be representative of the implementation of one or more of the disclosed techniques according to some embodiments. For example, logic flow 1200 may be representative of operations that VNFM 218 may perform in operating environment 1100 of FIG. 11 according to some embodiments. As shown in FIG. 12, a VNF-related VR performance threshold may be identified at 1202. For example, in operating environment 1100 of FIG. 11, VNFM 218 may identify VNF-related VR performance threshold 1136. At 1204, based on received VNF-related VR performance data, it may be determined whether the VNF-related VR performance threshold has been crossed. For example, in operating environment 1100 of FIG. 11, VNFM 218 may determine whether VNF-related VR performance threshold 1136 has been crossed based on VNF-related VR performance data 1137 received from VIM 220. At 1206, a VNF-related VR performance alarm notification may be sent to an element manager in response to a determination that the VNF-related VR performance threshold has been crossed. For example, in operating environment 1100 of FIG. 11, VNFM 218 may send VNF-related VR performance alarm notification 1138 to element manager 108 in response to a determination that VNF-related VR performance threshold 1136 has been crossed. The embodiments are not limited to these examples.

Figure 13:
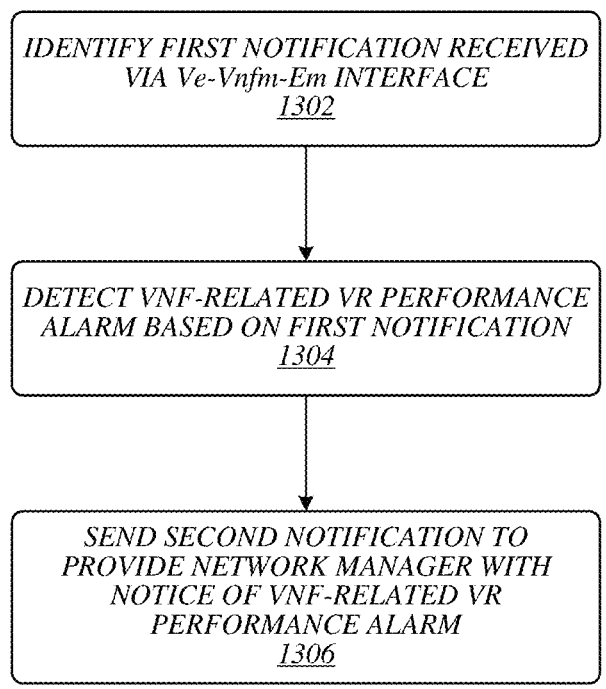
FIG. 13 illustrates an embodiment of a sixth logic flow.

FIG. 13 illustrates an example of a logic flow 1300 that may be representative of the implementation of one or more of the disclosed techniques according to some embodiments. For example, logic flow 1300 may be representative of operations that element manager 108 may perform in operating environment 1100 of FIG. 11 according to some embodiments. As shown in FIG. 13, a first notification, received via an Ve-Vnfm-Em interface, may be identified at 1302. For example, in operating environment 1100 of FIG. 11, element manager 108 may identify VNF-related VR performance alarm notification 1138, which it may receive from VNFM 218 via Ve-Vnfm-Em interface 224. At 1304, a VNF-related VR performance alarm may be detected based on the first notification. For example, in operating environment 1100 of FIG. 11, element manager 108 may detect a VNF-related VR performance alarm based on VNF-related VR performance alarm notification 1138. At 1306, a second notification may be sent in order to provide a network manager with notice of the VNF-related VR performance alarm. For example, in operating environment 1100 of FIG. 11, element manager 108 may send notification 1139 to network manager 106 in order to provide network manager 106 with notice of a VNF-related VR performance alarm detected based on VNF-related VR performance alarm notification 1138. The embodiments are not limited to these examples.

Figure 14A:
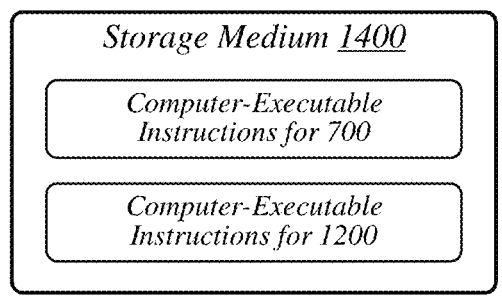
FIG. 14A illustrates an embodiment of a first storage medium.

FIG. 14A illustrates an embodiment of a storage medium 1400. Storage medium 1400 may comprise any computer-readable storage medium or machine-readable storage medium, such as an optical, magnetic or semiconductor storage medium. In some embodiments, storage medium 1400 may comprise a non-transitory storage medium. In various embodiments, storage medium 1400 may comprise an article of manufacture. In some embodiments, storage medium 1400 may store computer-executable instructions, such as computer-executable instructions to implement one or both of logic flows 700 and 1200. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited to these examples.

Figure 14B:
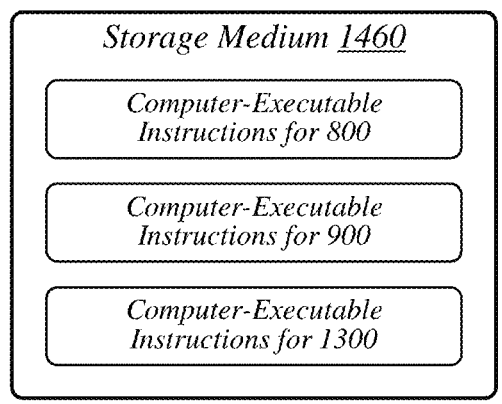
FIG. 14B illustrates an embodiment of a second storage medium.

FIG. 14B illustrates an embodiment of a storage medium 1460. Storage medium 1460 may comprise any computer-readable storage medium or machine-readable storage medium, such as an optical, magnetic or semiconductor storage medium. In some embodiments, storage medium 1460 may comprise a non-transitory storage medium. In various embodiments, storage medium 1460 may comprise an article of manufacture. In some embodiments, storage medium 1460 may store computer-executable instructions, such as computer-executable instructions to implement one or more of logic flows 800, 900, and 1300. Examples of a computer-readable storage medium or machine-readable storage medium and of computer-executable instructions may include any of the respective examples identified above in reference to storage medium 1400 of FIG. 14A. The embodiments are not limited to these examples.

Figure 14C:
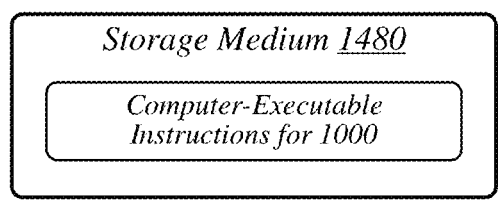
FIG. 14C illustrates an embodiment of a third storage medium.

FIG. 14C illustrates an embodiment of a storage medium 1480. Storage medium 1480 may comprise any computer-readable storage medium or machine-readable storage medium, such as an optical, magnetic or semiconductor storage medium. In some embodiments, storage medium 1480 may comprise a non-transitory storage medium. In various embodiments, storage medium 1480 may comprise an article of manufacture. In some embodiments, storage medium 1480 may store computer-executable instructions, such as computer-executable instructions to implement logic flow 1000. Examples of a computer-readable storage medium or machine-readable storage medium and of computer-executable instructions may include any of the respective examples identified above in reference to storage medium 1400 of FIG. 14A. The embodiments are not limited to these examples.

Figure 15:
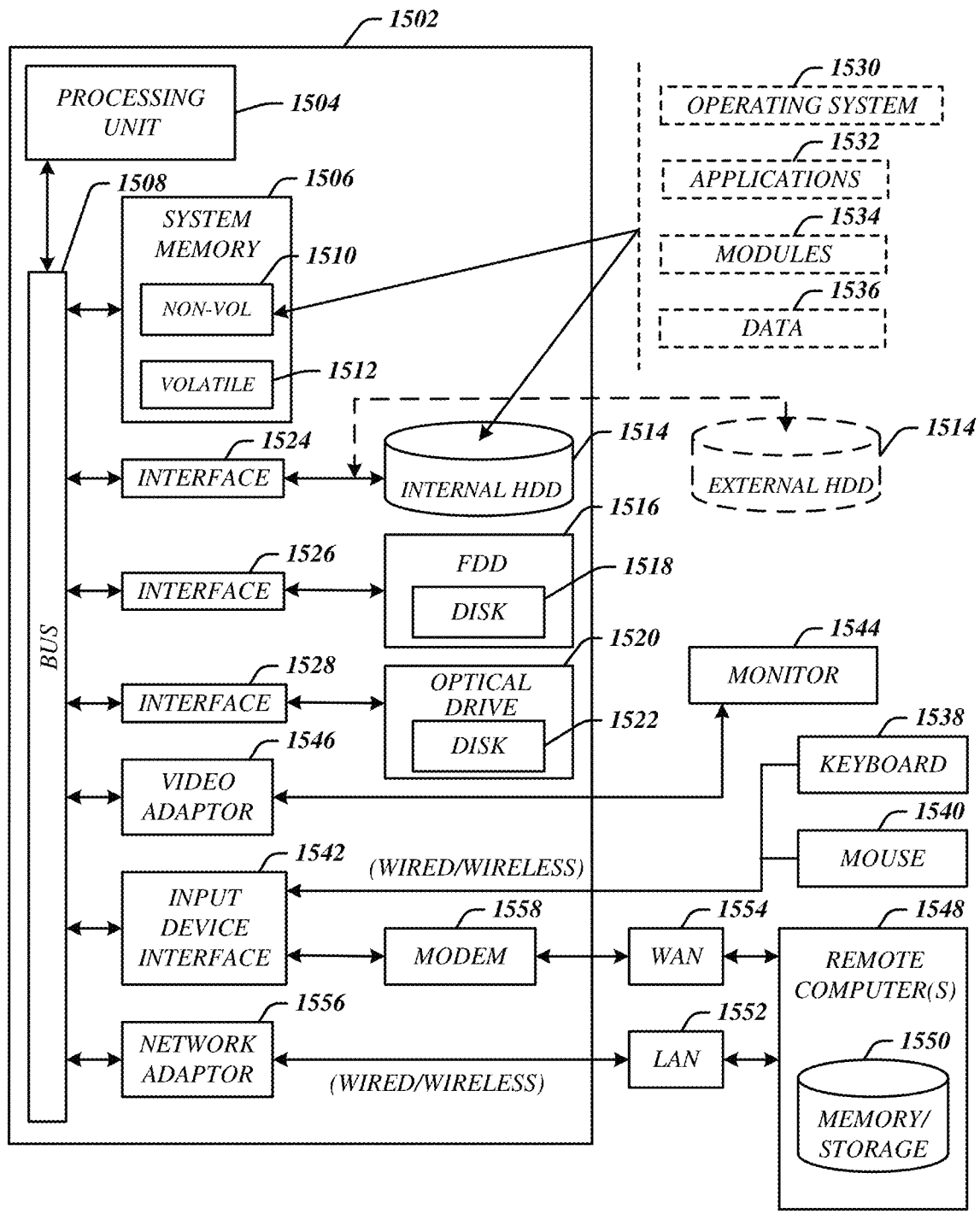
FIG. 15 illustrates an embodiment of a computing architecture.

FIG. 15 illustrates an embodiment of an exemplary computing architecture 1500 that may be suitable for implementing various embodiments as previously described. In various embodiments, the computing architecture 1500 may comprise or be implemented as part of an electronic device. In some embodiments, the computing architecture 1500 may be representative, for example, of a computing device suitable for use in conjunction with implementation of one or more of network manager 106, element manager 108, NFVI 214, NFVO 216, VNFM 218, VIM 220, logic flow 700, logic flow 800, logic flow 900, logic flow 1000, logic flow 1200, and logic flow 1300. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1500.

As shown in FIG. 15, according to computing architecture 1500, a computer 1502 comprises a processing unit 1504, a system memory 1506 and a system bus 1508. In some embodiments, computer 1502 may comprise a server. In some embodiments, computer 1502 may comprise a client. The processing unit 1504 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1504.

The system bus 1508 provides an interface for system components including, but not limited to, the system memory 1506 to the processing unit 1504. The system bus 1508 can be any of several types of bus structure that may further interconnect to a memory bus (with or without a memory controller), a peripheral bus, and a local bus using any of a variety of commercially available bus architectures. Interface adapters may connect to the system bus 1508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 15, the system memory 1506 can include non-volatile memory 1510 and/or volatile memory 1512. A basic input/output system (BIOS) can be stored in the non-volatile memory 1510.

The computer 1502 may include various types of computer-readable storage media in the form of one or more lower speed memory units, including an internal (or external) hard disk drive (HDD) 1514, a magnetic floppy disk drive (FDD) 1516 to read from or write to a removable magnetic disk 1518, and an optical disk drive 1520 to read from or write to a removable optical disk 1522 (e.g., a CD-ROM or DVD). The HDD 1514, FDD 1516 and optical disk drive 1520 can be connected to the system bus 1508 by a HDD interface 1524, an FDD interface 1526 and an optical drive interface 1528, respectively. The HDD interface 1524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1510, 1512, including an operating system 1530, one or more application programs 1532, other program modules 1534, and program data 1536.

A user can enter commands and information into the computer 1502 through one or more wire/wireless input devices, for example, a keyboard 1538 and a pointing device, such as a mouse 1540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1504 through an input device interface 1542 that is coupled to the system bus 1508, but can be connected by other interfaces such as a parallel port, IEEE 1394 serial port, a game port, a USB port, an IR interface, and so forth.

A monitor 1544 or other type of display device is also connected to the system bus 1508 via an interface, such as a video adaptor 1546. The monitor 1544 may be internal or external to the computer 1502. In addition to the monitor 1544, a computer typically includes other peripheral output devices, such as speakers, printers, and so forth.

The computer 1502 may operate in a networked environment using logical connections via wire and/or wireless communications to one or more remote computers, such as a remote computer 1548. The remote computer 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wire/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the LAN 1552 through a wire and/or wireless communication network interface or adaptor 1556. The adaptor 1556 can facilitate wire and/or wireless communications to the LAN 1552, which may also include a wireless access point disposed thereon for communicating with the wireless functionality of the adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wire and/or wireless device, connects to the system bus 1508 via the input device interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 16:
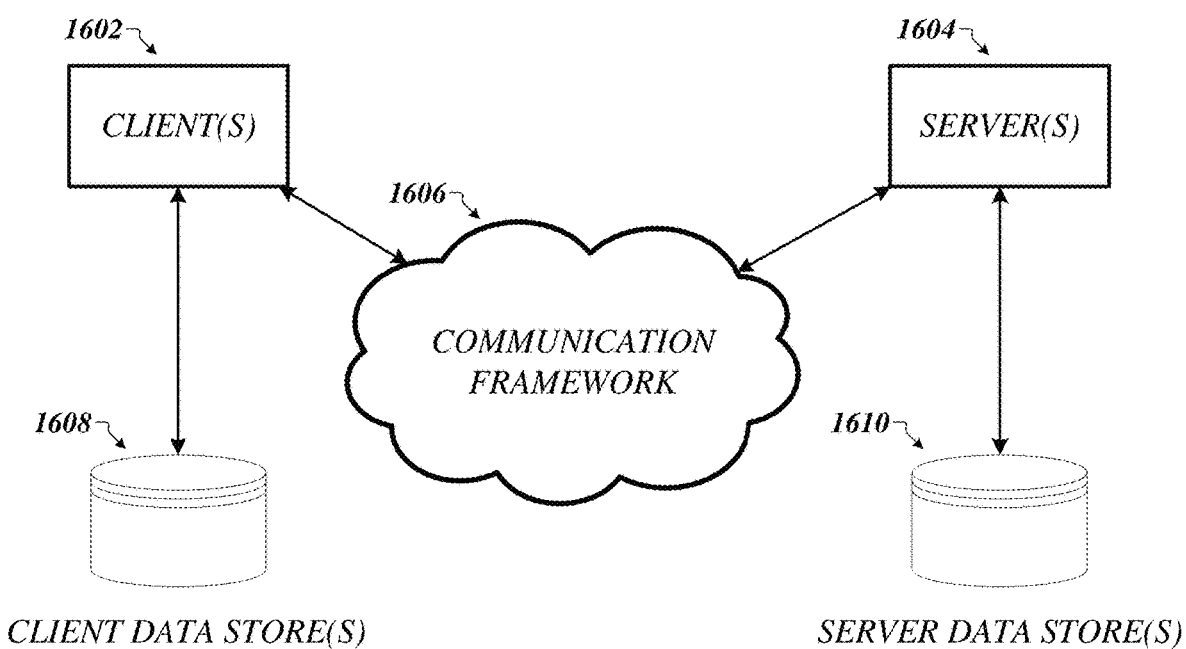
FIG. 16 illustrates an embodiment of a communications architecture.

FIG. 16 illustrates a block diagram of an exemplary communications architecture 1600 suitable for implementing various embodiments as previously described. The communications architecture 1600 includes various common communications elements, such as a transmitter, receiver, transceiver, radio, network interface, baseband processor, antenna, amplifiers, filters, power supplies, and so forth. The embodiments, however, are not limited to implementation by the communications architecture 1600.

As shown in FIG. 16, the communications architecture 1600 comprises includes one or more clients 1602 and servers 1604. The clients 1602 and the servers 1604 are operatively connected to one or more respective client data stores 1608 and server data stores 1610 that can be employed to store information local to the respective clients 1602 and servers 1604, such as cookies and/or associated contextual information. Any one of clients 1602 and/or servers 1604 may implement one or more of network manager 106, element manager 108, NFVI 214, NFVO 216, VNFM 218, VIM 220, logic flow 700, logic flow 800, logic flow 900, logic flow 1000, logic flow 1200, logic flow 1300, and computing architecture 1500.

The clients 1602 and the servers 1604 may communicate information between each other using a communication framework 1606. The communications framework 1606 may implement any well-known communications techniques and protocols. The communications framework 1606 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1606 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1602 and the servers 1604. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 17:
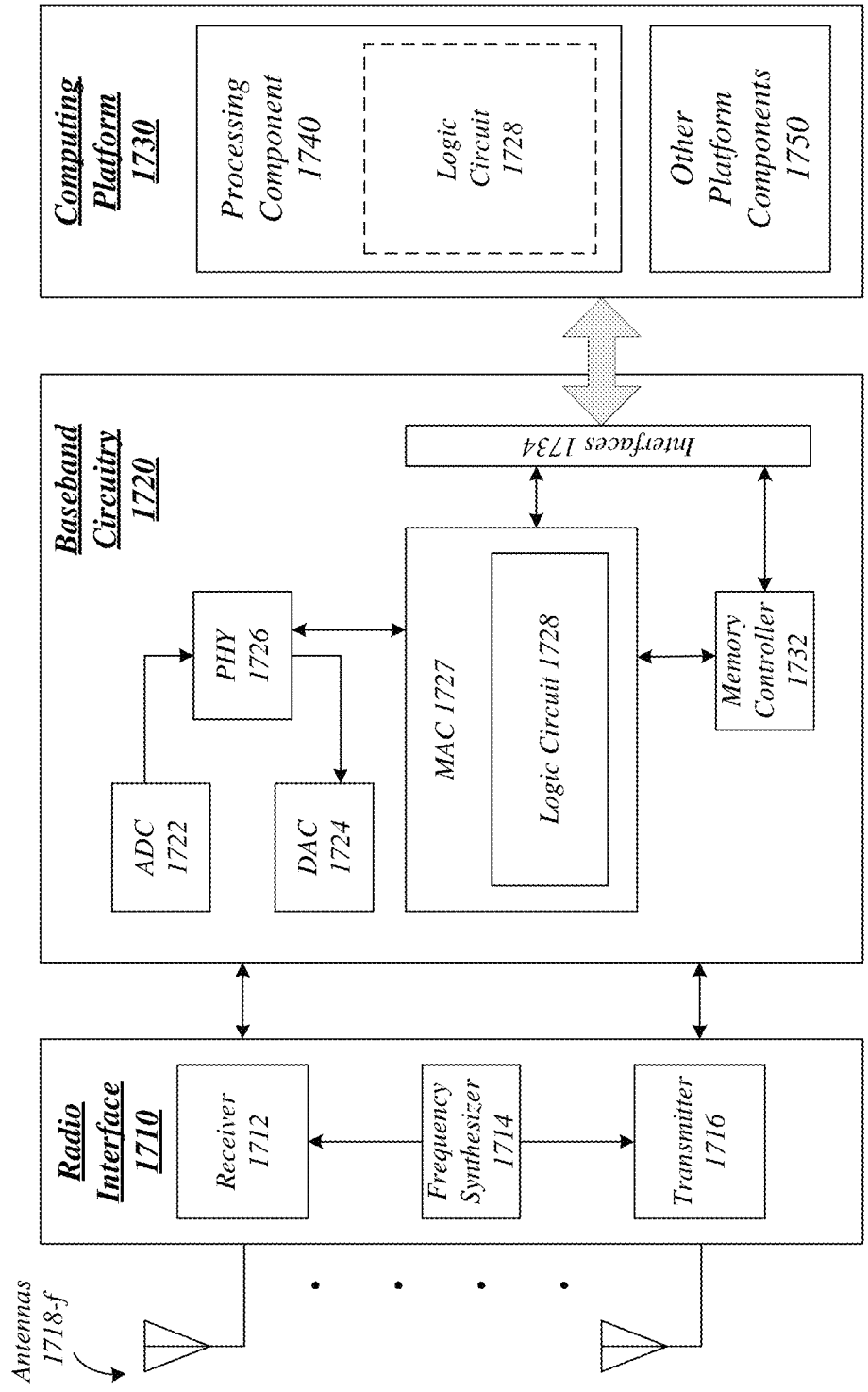
FIG. 17 illustrates an embodiment of a device.

FIG. 17 illustrates an embodiment of a communications device 1700 that may implement one or more of network manager 106, element manager 108, NFVI 214, NFVO 216, VNFM 218, VIM 220, logic flow 700, logic flow 800, logic flow 900, logic flow 1000, logic flow 1200, logic flow 1300, storage medium 1400, storage medium 1460, storage medium 1480, and computing architecture 1500 according to some embodiments. In various embodiments, device 1700 may comprise a logic circuit 1728. The logic circuit 1728 may include physical circuits to perform operations described for one or more of network manager 106, element manager 108, NFVI 214, NFVO 216, VNFM 218, VIM 220, logic flow 700, logic flow 800, logic flow 900, logic flow 1000, logic flow 1200, and logic flow 1300, for example. As shown in FIG. 17, device 1700 may include a radio interface 1710, baseband circuitry 1720, and computing platform 1730, although the embodiments are not limited to this configuration.

The device 1700 may implement some or all of the structure and/or operations for one or more of network manager 106, element manager 108, NFVI 214, NFVO 216, VNFM 218, VIM 220, logic flow 700, logic flow 800, logic flow 900, logic flow 1000, logic flow 1200, logic flow 1300, storage medium 1400, storage medium 1460, storage medium 1480, computing architecture 1500, and logic circuit 1728 in a single computing entity, such as entirely within a single device. Alternatively, the device 1700 may distribute portions of the structure and/or operations for one or more of network manager 106, element manager 108, NFVI 214, NFVO 216, VNFM 218, VIM 220, logic flow 700, logic flow 800, logic flow 900, logic flow 1000, logic flow 1200, logic flow 1300, storage medium 1400, storage medium 1460, storage medium 1480, computing architecture 1500, and logic circuit 1728 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1710 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1710 may include, for example, a receiver 1712, a frequency synthesizer 1714, and/or a transmitter 1716. Radio interface 1710 may include bias controls, a crystal oscillator and/or one or more antennas 1718-f. In another embodiment, radio interface 1710 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1720 may communicate with radio interface 1710 to process receive and/or transmit signals and may include, for example, a mixer for down-converting received RF signals, an analog-to-digital converter 1722 for converting analog signals to digital form, a digital-to-analog converter 1724 for converting digital signals to analog form, and a mixer for up-converting signals for transmission. Further, baseband circuitry 1720 may include a baseband or physical layer (PHY) processing circuit 1726 for PHY link layer processing of respective receive/transmit signals. Baseband circuitry 1720 may include, for example, a medium access control (MAC) processing circuit 1727 for MAC/data link layer processing. Baseband circuitry 1720 may include a memory controller 1732 for communicating with MAC processing circuit 1727 and/or a computing platform 1730, for example, via one or more interfaces 1734.

In some embodiments, PHY processing circuit 1726 may include a frame construction and/or detection module, in combination with additional circuitry such as a buffer memory, to construct and/or deconstruct communication frames. Alternatively or in addition, MAC processing circuit 1727 may share processing for certain of these functions or perform these processes independent of PHY processing circuit 1726. In some embodiments, MAC and PHY processing may be integrated into a single circuit.

The computing platform 1730 may provide computing functionality for the device 1700. As shown, the computing platform 1730 may include a processing component 1740. In addition to, or alternatively of, the baseband circuitry 1720, the device 1700 may execute processing operations or logic for one or more of network manager 106, element manager 108, NFVI 214, NFVO 216, VNFM 218, VIM 220, logic flow 700, logic flow 800, logic flow 900, logic flow 1000, logic flow 1200, logic flow 1300, storage medium 1400, storage medium 1460, storage medium 1480, computing architecture 1500, and logic circuit 1728 using the processing component 1740. The processing component 1740 (and/or PHY 1726 and/or MAC 1727) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1730 may further include other platform components 1750. Other platform components 1750 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1700 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1700 described herein, may be included or omitted in various embodiments of device 1700, as suitably desired.

Embodiments of device 1700 may be implemented using single input single output (SISO) architectures. However, certain implementations may include multiple antennas (e.g., antennas 1718-*f*) for transmission and/or reception using adaptive antenna techniques for beamforming or spatial division multiple access (SDMA) and/or using MIMO communication techniques.

The components and features of device 1700 may be implemented using any combination of discrete circuitry, application specific integrated circuits (ASICs), logic gates and/or single chip architectures. Further, the features of device 1700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1700 shown in the block diagram of FIG. 17 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 18:
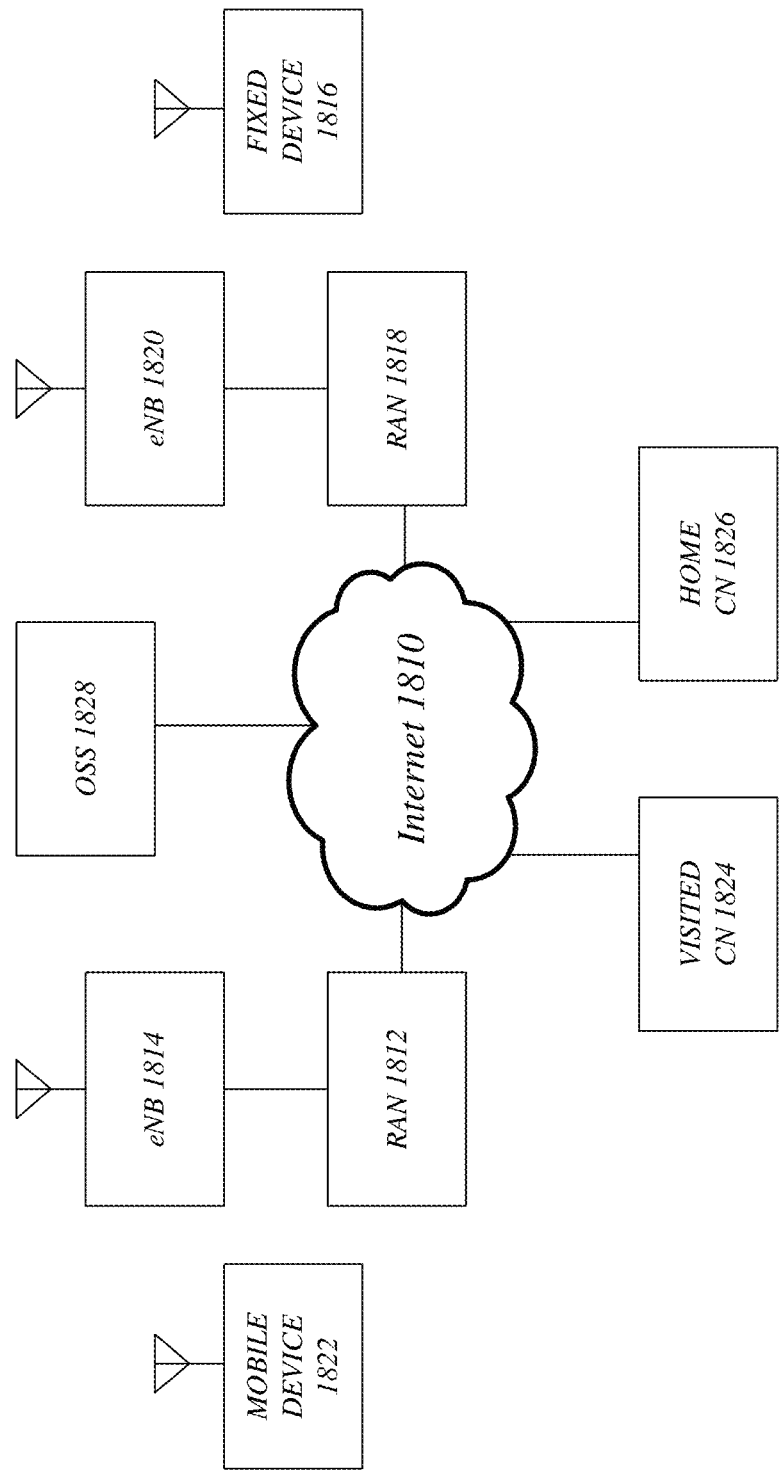
FIG. 18 illustrates an embodiment of a wireless network.

FIG. 18 illustrates an embodiment of a broadband wireless access system 1800. As shown in FIG. 18, broadband wireless access system 1800 may be an internet protocol (IP) type network comprising an internet 1810 type network or the like that is capable of supporting mobile wireless access and/or fixed wireless access to internet 1810. In one or more embodiments, broadband wireless access system 1800 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 1800, radio access networks (RANs) 1812 and 1818 are capable of coupling with evolved node Bs (eNBs) 1814 and 1820, respectively, to provide wireless communication between one or more fixed devices 1816 and internet 1810 and/or between or one or more mobile devices 1822 and Internet 1810. One example of a fixed device 1816 and a mobile device 1822 is device 1700 of FIG. 17, with the fixed device 1816 comprising a stationary version of device 1700 and the mobile device 1822 comprising a mobile version of device 1700. RANs 1812 and 1818 may implement profiles that are capable of defining the mapping of network functions to one or more physical entities on broadband wireless access system 1800. eNBs 1814 and 1820 may comprise radio equipment to provide RF communication with fixed device 1816 and/or mobile device 1822, such as described with reference to device 1700, and may comprise, for example, the PHY and MAC layer equipment in compliance with a 3GPP LTE Specification or an IEEE 802.16 Standard. eNBs 1814 and 1820 may further comprise an IP backplane to couple to Internet 1810 via RANs 1812 and 1818, respectively, although the scope of the claimed subject matter is not limited in these respects.

Broadband wireless access system 1800 may further comprise a visited core network (CN) 1824 and/or a home CN 1826, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1824 and/or home CN 1826, and the scope of the claimed subject matter is not limited in these respects. Visited CN 1824 may be referred to as a visited CN in the case where visited CN 1824 is not part of the regular service provider of fixed device 1816 or mobile device 1822, for example where fixed device 1816 or mobile device 1822 is roaming away from its respective home CN 1826, or where broadband wireless access system 1800 is part of the regular service provider of fixed device 1816 or mobile device 1822 but where broadband wireless access system 1800 may be in another location or state that is not the main or home location of fixed device 1816 or mobile device 1822. The embodiments are not limited in this context.

Fixed device 1816 may be located anywhere within range of one or both of eNBs 1814 and 1820, such as in or near a home or business to provide home or business customer broadband access to Internet 1810 via eNBs 1814 and 1820 and RANs 1812 and 1818, respectively, and home CN 1826. It is worthy of note that although fixed device 1816 is generally disposed in a stationary location, it may be moved to different locations as needed. Mobile device 1822 may be utilized at one or more locations if mobile device 1822 is within range of one or both of eNBs 1814 and 1820, for example. In accordance with one or more embodiments, operation support system (OSS) 1828 may be part of broadband wireless access system 1800 to provide management functions for broadband wireless access system 1800 and to provide interfaces between functional entities of broadband wireless access system 1800. Broadband wireless access system 1800 of FIG. 18 is merely one type of wireless network showing a certain number of the components of broadband wireless access system 1800, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is at least one computer-readable storage medium comprising a set of instructions that, in response to being executed on a computing device, cause the computing device to identify a virtualized network function (VNF)-related virtualized resource (VR) performance threshold for one or more VRs supporting a VNF used to implement a virtualized network element in a 3rd Generation Partnership Project (3GPP) network, determine whether the VNF-related VR performance threshold has been crossed based on received VNF-related VR performance data, and in response to a determination that the VNF-related VR performance threshold has been crossed, send a VNF-related VR performance alarm notification to an element manager (EM).

Example 2 is the at least one computer-readable storage medium of Example 1, comprising instructions that, in response to being executed on the computing device, cause the computing device to send the VNF-related VR performance alarm notification to the EM via a Ve-Vnfm-Em reference point.

Example 3 is the at least one computer-readable storage medium of any of Examples 1 to 2, the VNF-related VR performance data to be received via a Vi-Vnfm reference point.

Example 4 is the at least one computer-readable storage medium of any of Examples 1 to 3, comprising instructions that, in response to being executed on the computing device, cause the computing device to identify the VNF-related VR performance threshold based on a message received from the EM.

Example 5 is the at least one computer-readable storage medium of any of Examples 1 to 4, comprising instructions that, in response to being executed on the computing device, cause the computing device to send the VNF-related VR performance alarm notification to the EM in response to a determination that the VNF-related VR performance threshold has been reached.

Example 6 is the at least one computer-readable storage medium of any of Examples 1 to 5, the VNF-related VR performance data to be received from a virtualized infrastructure manager (VIM).

Example 7 is the at least one computer-readable storage medium of Example 6, comprising instructions that, in response to being executed on the computing device, cause the computing device to send a message to the VIM to cause the VIM to collect the VNF-related VR performance data.

Example 8 is the at least one computer-readable storage medium of Example 7, comprising instructions that, in response to being executed on the computing device, cause the computing device to send the message to cause the VIM to collect the VNF-related VR performance data in response to a request received from the EM.

Example 9 is the at least one computer-readable storage medium of any of Examples 1 to 8, the virtualized network element to comprise a virtualized evolved node B (veNB).

Example 10 is the at least one computer-readable storage medium of any of Examples 1 to 8, the virtualized network element to comprise a virtualized mobility management entity (vMME).

Example 11 is the at least one computer-readable storage medium of any of Examples 1 to 8, the virtualized network element to comprise a virtualized serving gateway (vSGW).

Example 12 is the at least one computer-readable storage medium of any of Examples 1 to 8, the virtualized network element to comprise a virtualized packet data network gateway (vPGW).

Example 13 is an apparatus, comprising processing circuitry, and computer-readable storage media having stored thereon instructions for execution by the processing circuitry to identify a virtualized network function (VNF)-related virtualized resource (VR) performance threshold for one or more VRs supporting a VNF used to implement a virtualized network element in a 3rd Generation Partnership Project (3GPP) network, determine whether the VNF-related VR performance threshold has been crossed or reached, and in response to a determination that the VNF-related VR performance threshold has been crossed, send a VNF-related VR performance alarm notification to an element manager (EM) via an Ve-Vnfm-Em interface.

Example 14 is the apparatus of Example 13, the computer-readable storage media having stored thereon instructions for execution by the processing circuitry to identify the VNF-related VR performance threshold based on a message received from the EM.

Example 15 is the apparatus of any of Examples 13 to 14, the computer-readable storage media having stored thereon instructions for execution by the processing circuitry to determine whether the VNF-related VR performance threshold has been crossed based on received VNF-related VR performance data.

Example 16 is the apparatus of Example 15, the VNF-related VR performance data to be received via a Vi-Vnfm interface.

Example 17 is the apparatus of any of Examples 15 to 16, the VNF-related VR performance data to be received from a virtualized infrastructure manager (VIM).

Example 18 is the apparatus of Example 17, the computer-readable storage media having stored thereon instructions for execution by the processing circuitry to send a message to the VIM to cause the VIM to collect the VNF-related VR performance data.

Example 19 is the apparatus of Example 18, the computer-readable storage media having stored thereon instructions for execution by the processing circuitry to send the message to cause the VIM to collect the VNF-related VR performance data in response to a request received from the EM.

Example 20 is the apparatus of any of Examples 13 to 19, the virtualized network element to comprise a virtualized evolved node B (veNB).

Example 21 is the apparatus of any of Examples 13 to 19, the virtualized network element to comprise a virtualized mobility management entity (vMME).

Example 22 is the apparatus of any of Examples 13 to 19, the virtualized network element to comprise a virtualized serving gateway (vSGW).

Example 23 is the apparatus of any of Examples 13 to 19, the virtualized network element to comprise a virtualized packet data network gateway (vPGW).

Example 24 is a system, comprising an apparatus according to any of Examples 13 to 23, and at least one network interface adapter.

Example 25 is an apparatus, comprising processing circuitry, and computer-readable storage media having stored thereon instructions for execution by the processing circuitry to identify a first notification received from a virtualized network functions manager (VNFM), detect, based on the first notification, a virtualized network function (VNF)-related virtualized resource (VR) performance alarm associated with one or more VRs supporting a VNF used to implement a virtualized network element in a 3rd Generation Partnership Project (3GPP) network, and send a second notification to an integration reference point manager (IRPManager) to provide notice of the VNF-related VR performance alarm.

Example 26 is the apparatus of Example 25, the first notification to be received from the VNFM via a Ve-Vnfm-Em reference point.

Example 27 is the apparatus of any of Examples 25 to 26, the second notification to be sent to the IRPManager via an Itf-N reference point.

Example 28 is the apparatus of any of Examples 25 to 27, the IRPManager to comprise a network manager (NM) entity.

Example 29 is the apparatus of any of Examples 25 to 28, the virtualized network element to comprise a virtualized evolved node B (veNB).

Example 30 is the apparatus of any of Examples 25 to 28, the virtualized network element to comprise a virtualized mobility management entity (vMME).

Example 31 is the apparatus of any of Examples 25 to 28, the virtualized network element to comprise a virtualized serving gateway (vSGW).

Example 32 is the apparatus of any of Examples 25 to 28, the virtualized network element to comprise a virtualized packet data network gateway (vPGW).

Example 33 is a system, comprising an apparatus according to any of Examples 25 to 32, and at least one network interface adapter.

Example 34 is at least one computer-readable storage medium comprising a set of instructions that, in response to being executed on a computing device, cause the computing device to identify a first notification received via a Ve-Vnfm-Em interface, detect, based on the first notification, a virtualized network function (VNF)-related virtualized resource (VR) performance alarm associated with one or more VRs supporting a VNF used to implement a virtualized network element in a 3rd Generation Partnership Project (3GPP) network, and send a second notification to provide a network manager (NM) with notice of the VNF-related VR performance alarm.

Example 35 is the at least one computer-readable storage medium of Example 34, the first notification to be received from a virtualized network functions manager (VNFM).

Example 36 is the at least one computer-readable storage medium of any of Examples 34 to 35, the second notification to be sent to an integration reference point manager (IRPManager).

Example 37 is the at least one computer-readable storage medium of Example 36, the second notification to be sent to the IRPManager via an Itf-N interface.

Example 38 is the at least one computer-readable storage medium of any of Examples 34 to 37, the virtualized network element to comprise a virtualized evolved node B (veNB).

Example 39 is the at least one computer-readable storage medium of any of Examples 34 to 37, the virtualized network element to comprise a virtualized mobility management entity (vMME).

Example 40 is the at least one computer-readable storage medium of any of Examples 34 to 37, the virtualized network element to comprise a virtualized serving gateway (vSGW).

Example 41 is the at least one computer-readable storage medium of any of Examples 34 to 37, the virtualized network element to comprise a virtualized packet data network gateway (vPGW).

Example 42 is at least one computer-readable storage medium comprising a set of instructions that, in response to being executed on a computing device, cause the computing device to identify a virtualized network function (VNF)-related virtualized resource (VR) performance data threshold, determine whether the VNF-related VR performance data threshold has been crossed based on received VNF-related VR performance data, and in response to a determination that the VNF-related VR performance data threshold has been crossed, send a VNF-related VR performance alarm notification to an element manager (EM).

Example 43 is the at least one computer-readable storage medium of Example 42, comprising instructions that, in response to being executed on the computing device, cause the computing device to send the VNF-related VR performance alarm notification to the EM via a Ve-Vnfm-Em reference point.

Example 44 is the at least one computer-readable storage medium of any of Examples 42 to 43, the VNF-related VR performance data to be received via a Vi-Vnfm reference point.

Example 45 is the at least one computer-readable storage medium of any of Examples 42 to 44, the VNF-related VR performance data to be received from a virtualized infrastructure manager (VIM).

Example 46 is the at least one computer-readable storage medium of Example 45, comprising instructions that, in response to being executed on the computing device, cause the computing device to send a message to the VIM to cause the VIM to collect the VNF-related VR performance data.

Example 47 is the at least one computer-readable storage medium of any of Examples 42 to 46, comprising instructions that, in response to being executed on the computing device, cause the computing device to send the VNF-related VR performance alarm notification to the EM in response to a determination that the VNF-related VR performance data threshold has been reached.

Example 48 is an apparatus, comprising processing circuitry, and computer-readable storage media having stored thereon instructions for execution by the processing circuitry to identify a first notification received from a virtualized network functions manager (VNFM), detect a virtualized network function (VNF)-related virtualized resource (VR) performance alarm based on the first notification, and send a second notification to an integration reference point manager (IRPManager) to provide notice of the VNF-related VR performance alarm.

Example 49 is the apparatus of Example 48, the first notification to be received from the VNFM via a Ve-Vnfm-Em reference point.

Example 50 is the apparatus of any of Examples 48 to 49, the second notification to be sent to the IRPManager via an Itf-N reference point.

Example 51 is the apparatus of any of Examples 48 to 50, the IRPManager to comprise a network manager (NM) entity.

Example 52 is at least one computer-readable storage medium comprising a set of instructions that, in response to being executed on a computing device, cause the computing device to identify a virtualized network function (VNF)-related virtualized resource (VR) performance data threshold associated with received virtualized resource (VR) performance measurement (PM) data, determine whether the VNF-related VR performance data threshold has been crossed based on the received VNF-related VR performance data, and in response to a determination that the VNF-related VR performance data threshold has been crossed, send a VNF-related VR performance alarm notification to a network manager (NM).

Example 53 is the at least one computer-readable storage medium of Example 52, comprising instructions that, in response to being executed on the computing device, cause the computing device to send the VNF-related VR performance alarm notification to the NM via a Itf-N reference point.

Example 54 is the at least one computer-readable storage medium of any of Examples 52 to 53, the VNF-related VR performance data to be received via a Ve-Vnfm-Em reference point.

Example 55 is the at least one computer-readable storage medium of any of Examples 52 to 54, the VNF-related VR performance data to be received from a virtualized network functions manager (VNFM).

Example 56 is the at least one computer-readable storage medium of Example 55, comprising instructions that, in response to being executed on the computing device, cause the computing device to send a message to the VNFM to cause the VNFM to provide the VNF-related VR performance data.

Example 57 is the at least one computer-readable storage medium of any of Examples 52 to 56, comprising instructions that, in response to being executed on the computing device, cause the computing device to send the VNF-related VR performance alarm notification to the NM in response to a determination that the VNF-related VR performance data threshold has been reached.

Example 58 is an apparatus, comprising processing circuitry, and computer-readable storage media having stored thereon instructions for execution by the processing circuitry to detect a virtualized network function (VNF)-related virtualized resource (VR) performance alarm based on a notification received from an element manager (EM), based on the detected VNF-related VR performance alarm, determine that a VNF instance is to be restarted, and send a VNF restart request to a network functions virtualization orchestrator (NFVO) to request that the VNF instance be restarted.

Example 59 is the apparatus of Example 58, the notification to be received from the EM via an Itf-N reference point.

Example 60 is the apparatus of any of Examples 58 to 59, the VNF restart request to be sent to the NFVO via an Os-Ma-Nfvo reference point.

Example 61 is the apparatus of any of Examples 58 to 60, the computer-readable storage media having stored thereon instructions for execution by the processing circuitry to act as an Integration Reference Point Manager (IRPManager) to receive the first notification from the EM.

Example 62 is a method, comprising identifying a virtualized network function (VNF)-related virtualized resource (VR) performance threshold for one or more VRs supporting a VNF used to implement a virtualized network element in a 3rd Generation Partnership Project (3GPP) network, determining whether the VNF-related VR performance threshold has been crossed based on received VNF-related VR performance data, and in response to a determination that the VNF-related VR performance threshold has been crossed, sending a VNF-related VR performance alarm notification to an element manager (EM).

Example 63 is the method of Example 62, comprising sending the VNF-related VR performance alarm notification to the EM via a Ve-Vnfm-Em reference point.

Example 64 is the method of any of Examples 62 to 63, the VNF-related VR performance data to be received via a Vi-Vnfm reference point.

Example 65 is the method of any of Examples 62 to 64, comprising identifying the VNF-related VR performance threshold based on a message received from the EM.

Example 66 is the method of any of Examples 62 to 65, comprising sending the VNF-related VR performance alarm notification to the EM in response to a determination that the VNF-related VR performance threshold has been reached.

Example 67 is the method of any of Examples 62 to 66, the VNF-related VR performance data to be received from a virtualized infrastructure manager (VIM).

Example 68 is the method of Example 67, comprising sending a message to the VIM to cause the VIM to collect the VNF-related VR performance data.

Example 69 is the method of Example 68, comprising sending the message to cause the VIM to collect the VNF-related VR performance data in response to a request received from the EM.

Example 70 is the method of any of Examples 62 to 69, the virtualized network element to comprise a virtualized evolved node B (veNB).

Example 71 is the method of any of Examples 62 to 69, the virtualized network element to comprise a virtualized mobility management entity (vMME).

Example 72 is the method of any of Examples 62 to 69, the virtualized network element to comprise a virtualized serving gateway (vSGW).

Example 73 is the method of any of Examples 62 to 69, the virtualized network element to comprise a virtualized packet data network gateway (vPGW).

Example 74 is at least one computer-readable storage medium comprising a set of instructions that, in response to being executed on a computing device, cause the computing device to perform a method according to any of Examples 62 to 73.

Example 75 is an apparatus, comprising means for performing a method according to any of Examples 62 to 73.

Example 76 is a system, comprising the apparatus of Example 75, and at least one network interface adapter.

Example 77 is at least one computer-readable storage medium comprising a set of instructions that, in response to being executed on a computing device, cause the computing device to identify a virtualized network function (VNF)-related virtualized resource (VR) performance threshold for one or more VRs supporting a VNF used to implement a virtualized network element in a 3rd Generation Partnership Project (3GPP) network, determine whether the VNF-related VR performance threshold has been crossed or reached, and in response to a determination that the VNF-related VR performance threshold has been crossed, send a VNF-related VR performance alarm notification to an element manager (EM) via an Ve-Vnfm-Em interface.

Example 78 is the at least one computer-readable storage medium of Example 77, comprising instructions that, in response to being executed on the computing device, cause the computing device to identify the VNF-related VR performance threshold based on a message received from the EM.

Example 79 is the at least one computer-readable storage medium of any of Examples 77 to 78, comprising instructions that, in response to being executed on the computing device, cause the computing device to determine whether the VNF-related VR performance threshold has been crossed based on received VNF-related VR performance data.

Example 80 is the at least one computer-readable storage medium of Example 79, the VNF-related VR performance data to be received via a Vi-Vnfm interface.

Example 81 is the at least one computer-readable storage medium of any of Examples 79 to 80, the VNF-related VR performance data to be received from a virtualized infrastructure manager (VIM).

Example 82 is the at least one computer-readable storage medium of Example 81, comprising instructions that, in response to being executed on the computing device, cause the computing device to send a message to the VIM to cause the VIM to collect the VNF-related VR performance data.

Example 83 is the at least one computer-readable storage medium of Example 82, comprising instructions that, in response to being executed on the computing device, cause the computing device to send the message to cause the VIM to collect the VNF-related VR performance data in response to a request received from the EM.

Example 84 is the at least one computer-readable storage medium of any of Examples 77 to 83, the virtualized network element to comprise a virtualized evolved node B (veNB).

Example 85 is the at least one computer-readable storage medium of any of Examples 77 to 83, the virtualized network element to comprise a virtualized mobility management entity (vMME).

Example 86 is the at least one computer-readable storage medium of any of Examples 77 to 83, the virtualized network element to comprise a virtualized serving gateway (vSGW).

Example 87 is the at least one computer-readable storage medium of any of Examples 77 to 83, the virtualized network element to comprise a virtualized packet data network gateway (vPGW).

Example 88 is at least one computer-readable storage medium comprising a set of instructions that, in response to being executed on a computing device, cause the computing device to identify a first notification received from a virtualized network functions manager (VNFM), detect, based on the first notification, a virtualized network function (VNF)-related virtualized resource (VR) performance alarm associated with one or more VRs supporting a VNF used to implement a virtualized network element in a 3rd Generation Partnership Project (3GPP) network, and send a second notification to an integration reference point manager (IRPManager) to provide notice of the VNF-related VR performance alarm.

Example 89 is the at least one computer-readable storage medium of Example 88, the first notification to be received from the VNFM via a Ve-Vnfm-Em reference point.

Example 90 is the at least one computer-readable storage medium of any of Examples 88 to 89, the second notification to be sent to the IRPManager via an Itf-N reference point.

Example 91 is the at least one computer-readable storage medium of any of Examples 88 to 90, the IRPManager to comprise a network manager (NM) entity.

Example 92 is the at least one computer-readable storage medium of any of Examples 88 to 91, the virtualized network element to comprise a virtualized evolved node B (veNB).

Example 93 is the at least one computer-readable storage medium of any of Examples 88 to 91, the virtualized network element to comprise a virtualized mobility management entity (vMME).

Example 94 is the at least one computer-readable storage medium of any of Examples 88 to 91, the virtualized network element to comprise a virtualized serving gateway (vSGW).

Example 95 is the at least one computer-readable storage medium of any of Examples 88 to 91, the virtualized network element to comprise a virtualized packet data network gateway (vPGW).

Example 96 is a method, comprising identifying a first notification received via a Ve-Vnfm-Em interface, detecting, based on the first notification, a virtualized network function (VNF)-related virtualized resource (VR) performance alarm associated with one or more VRs supporting a VNF used to implement a virtualized network element in a 3rd Generation Partnership Project (3GPP) network, and sending a second notification to provide a network manager (NM) with notice of the VNF-related VR performance alarm.

Example 97 is the method of Example 96, the first notification to be received from a virtualized network functions manager (VNFM).

Example 98 is the method of any of Examples 96 to 97, the second notification to be sent to an integration reference point manager (IRPManager).

Example 99 is the method of Example 98, the second notification to be sent to the IRPManager via an Itf-N interface.

Example 100 is the method of any of Examples 96 to 99, the virtualized network element to comprise a virtualized evolved node B (veNB).

Example 101 is the method of any of Examples 96 to 99, the virtualized network element to comprise a virtualized mobility management entity (vMME).

Example 102 is the method of any of Examples 96 to 99, the virtualized network element to comprise a virtualized serving gateway (vSGW).

Example 103 is the method of any of Examples 96 to 99, the virtualized network element to comprise a virtualized packet data network gateway (vPGW).

Example 104 is at least one computer-readable storage medium comprising a set of instructions that, in response to being executed on a computing device, cause the computing device to perform a method according to any of Examples 96 to 103.

Example 105 is an apparatus, comprising means for performing a method according to any of Examples 96 to 103.

Example 106 is a system, comprising the apparatus of Example 105, and at least one network interface adapter.

Example 107 is a method, comprising identifying a virtualized network function (VNF)-related virtualized resource (VR) performance data threshold, determining whether the VNF-related VR performance data threshold has been crossed based on received VNF-related VR performance data, and in response to a determination that the VNF-related VR performance data threshold has been crossed, sending a VNF-related VR performance alarm notification to an element manager (EM).

Example 108 is the method of Example 107, comprising sending the VNF-related VR performance alarm notification to the EM via a Ve-Vnfm-Em reference point.

Example 109 is the method of any of Examples 107 to 108, the VNF-related VR performance data to be received via a Vi-Vnfm reference point.

Example 110 is the method of any of Examples 107 to 109, the VNF-related VR performance data to be received from a virtualized infrastructure manager (VIM).

Example 111 is the method of Example 110, comprising sending a message to the VIM to cause the VIM to collect the VNF-related VR performance data.

Example 112 is the method of any of Examples 107 to 111, comprising sending the VNF-related VR performance alarm notification to the EM in response to a determination that the VNF-related VR performance data threshold has been reached.

Example 113 is at least one computer-readable storage medium comprising a set of instructions that, in response to being executed on a computing device, cause the computing device to perform a method according to any of Examples 107 to 112.

Example 114 is an apparatus, comprising means for performing a method according to any of Examples 107 to 112.

Example 115 is a system, comprising the apparatus of Example 114, and at least one network interface adapter.

Example 116 is at least one computer-readable storage medium comprising a set of instructions that, in response to being executed on a computing device, cause the computing device to identify a first notification received from a virtualized network functions manager (VNFM), detect a virtualized network function (VNF)-related virtualized resource (VR) performance alarm based on the first notification, and send a second notification to an integration reference point manager (IRPManager) to provide notice of the VNF-related VR performance alarm.

Example 117 is the at least one computer-readable storage medium of Example 116, the first notification to be received from the VNFM via a Ve-Vnfm-Em reference point.

Example 118 is the at least one computer-readable storage medium of any of Examples 116 to 117, the second notification to be sent to the IRPManager via an Itf-N reference point.

Example 119 is the at least one computer-readable storage medium of any of Examples 116 to 118, the IRPManager to comprise a network manager (NM) entity.

Example 120 is a method, comprising identifying a virtualized network function (VNF)-related virtualized resource (VR) performance data threshold associated with received virtualized resource (VR) performance measurement (PM) data, determining whether the VNF-related VR performance data threshold has been crossed based on the received VNF-related VR performance data, and in response to a determination that the VNF-related VR performance data threshold has been crossed, sending a VNF-related VR performance alarm notification to a network manager (NM).

Example 121 is the method of Example 120, comprising sending the VNF-related VR performance alarm notification to the NM via a Itf-N reference point.

Example 122 is the method of any of Examples 120 to 121, the VNF-related VR performance data to be received via a Ve-Vnfm-Em reference point.

Example 123 is the method of any of Examples 120 to 122, the VNF-related VR performance data to be received from a virtualized network functions manager (VNFM).

Example 124 is the method of Example 123, comprising sending a message to the VNFM to cause the VNFM to provide the VNF-related VR performance data.

Example 125 is the method of any of Examples 120 to 124, comprising sending the VNF-related VR performance alarm notification to the NM in response to a determination that the VNF-related VR performance data threshold has been reached.

Example 126 is at least one computer-readable storage medium comprising a set of instructions that, in response to being executed on a computing device, cause the computing device to perform a method according to any of Examples 120 to 125.

Example 127 is an apparatus, comprising means for performing a method according to any of Examples 120 to 125.

Example 128 is a system, comprising the apparatus of Example 127, and at least one network interface adapter.

Example 129 is at least one computer-readable storage medium comprising a set of instructions that, in response to being executed on a computing device, cause the computing device to detect a virtualized network function (VNF)-related virtualized resource (VR) performance alarm based on a notification received from an element manager (EM), based on the detected VNF-related VR performance alarm, determine that a VNF instance is to be restarted, and send a VNF restart request to a network functions virtualization orchestrator (NFVO) to request that the VNF instance be restarted.

Example 130 is the at least one computer-readable storage medium of Example 129, the notification to be received from the EM via an Itf-N reference point.

Example 131 is the at least one computer-readable storage medium of any of Examples 129 to 130, the VNF restart request to be sent to the NFVO via an Os-Ma-Nfvo reference point.

Example 132 is the at least one computer-readable storage medium of any of Examples 129 to 131, comprising instructions that, in response to being executed on the computing device, cause the computing device to act as an Integration Reference Point Manager (IRPManager) to receive the first notification from the EM.

Example 133 is an apparatus, comprising means for identifying a virtualized network function (VNF)-related virtualized resource (VR) performance threshold for one or more VRs supporting a VNF used to implement a virtualized network element in a 3rd Generation Partnership Project (3GPP) network, means for determining whether the VNF-related VR performance threshold has been crossed based on received VNF-related VR performance data, and means for, in response to a determination that the VNF-related VR performance threshold has been crossed, sending a VNF-related VR performance alarm notification to an element manager (EM).

Example 134 is the apparatus of Example 133, comprising means for sending the VNF-related VR performance alarm notification to the EM via a Ve-Vnfm-Em reference point.

Example 135 is the apparatus of any of Examples 133 to 134, the VNF-related VR performance data to be received via a Vi-Vnfm reference point.

Example 136 is the apparatus of any of Examples 133 to 135, comprising means for identifying the VNF-related VR performance threshold based on a message received from the EM.

Example 137 is the apparatus of any of Examples 133 to 136, comprising means for sending the VNF-related VR performance alarm notification to the EM in response to a determination that the VNF-related VR performance threshold has been reached.

Example 138 is the apparatus of any of Examples 133 to 137, the VNF-related VR performance data to be received from a virtualized infrastructure manager (VIM).

Example 139 is the apparatus of Example 138, comprising means for sending a message to the VIM to cause the VIM to collect the VNF-related VR performance data.

Example 140 is the apparatus of Example 139, comprising means for sending the message to cause the VIM to collect the VNF-related VR performance data in response to a request received from the EM.

Example 141 is the apparatus of any of Examples 133 to 140, the virtualized network element to comprise a virtualized evolved node B (veNB).

Example 142 is the apparatus of any of Examples 133 to 140, the virtualized network element to comprise a virtualized mobility management entity (vMME).

Example 143 is the apparatus of any of Examples 133 to 140, the virtualized network element to comprise a virtualized serving gateway (vSGW).

Example 144 is the apparatus of any of Examples 133 to 140, the virtualized network element to comprise a virtualized packet data network gateway (vPGW).

Example 145 is a system, comprising an apparatus according to any of Examples 133 to 144, and at least one network interface adapter.

Example 146 is a method, comprising identifying a virtualized network function (VNF)-related virtualized resource (VR) performance threshold for one or more VRs supporting a VNF used to implement a virtualized network element in a 3rd Generation Partnership Project (3GPP) network, determining whether the VNF-related VR performance threshold has been crossed or reached, and in response to a determination that the VNF-related VR performance threshold has been crossed, sending a VNF-related VR performance alarm notification to an element manager (EM) via an Ve-Vnfm-Em interface.

Example 147 is the method of Example 146, comprising identifying the VNF-related VR performance threshold based on a message received from the EM.

Example 148 is the method of any of Examples 146 to 147, comprising determining whether the VNF-related VR performance threshold has been crossed based on received VNF-related VR performance data.

Example 149 is the method of Example 148, the VNF-related VR performance data to be received via a Vi-Vnfm interface.

Example 150 is the method of any of Examples 148 to 149, the VNF-related VR performance data to be received from a virtualized infrastructure manager (VIM).

Example 151 is the method of Example 150, comprising sending a message to the VIM to cause the VIM to collect the VNF-related VR performance data.

Example 152 is the method of Example 151, comprising sending the message to cause the VIM to collect the VNF-related VR performance data in response to a request received from the EM.

Example 153 is the method of any of Examples 146 to 152, the virtualized network element to comprise a virtualized evolved node B (veNB).

Example 154 is the method of any of Examples 146 to 152, the virtualized network element to comprise a virtualized mobility management entity (vMME).

Example 155 is the method of any of Examples 146 to 152, the virtualized network element to comprise a virtualized serving gateway (vSGW).

Example 156 is the method of any of Examples 146 to 152, the virtualized network element to comprise a virtualized packet data network gateway (vPGW).

Example 157 is at least one computer-readable storage medium comprising a set of instructions that, in response to being executed on a computing device, cause the computing device to perform a method according to any of Examples 146 to 156.

Example 158 is an apparatus, comprising means for performing a method according to any of Examples 146 to 156.

Example 159 is a system, comprising the apparatus of Example 158, and at least one network interface adapter.

Example 160 is a method, comprising identifying a first notification received from a virtualized network functions manager (VNFM), detecting, based on the first notification, a virtualized network function (VNF)-related virtualized resource (VR) performance alarm associated with one or more VRs supporting a VNF used to implement a virtualized network element in a 3rd Generation Partnership Project (3GPP) network, and sending a second notification to an integration reference point manager (IRPManager) to provide notice of the VNF-related VR performance alarm.

Example 161 is the method of Example 160, the first notification to be received from the VNFM via a Ve-Vnfm-Em reference point.

Example 162 is the method of any of Examples 160 to 161, the second notification to be sent to the IRPManager via an Itf-N reference point.

Example 163 is the method of any of Examples 160 to 162, the IRPManager to comprise a network manager (NM) entity.

Example 164 is the method of any of Examples 160 to 163, the virtualized network element to comprise a virtualized evolved node B (veNB).

Example 165 is the method of any of Examples 160 to 163, the virtualized network element to comprise a virtualized mobility management entity (vMME).

Example 166 is the method of any of Examples 160 to 163, the virtualized network element to comprise a virtualized serving gateway (vSGW).

Example 167 is the method of any of Examples 160 to 163, the virtualized network element to comprise a virtualized packet data network gateway (vPGW).

Example 168 is at least one computer-readable storage medium comprising a set of instructions that, in response to being executed on a computing device, cause the computing device to perform a method according to any of Examples 160 to 167.

Example 169 is an apparatus, comprising means for performing a method according to any of Examples 160 to 167.

Example 170 is a system, comprising the apparatus of Example 169, and at least one network interface adapter.

Example 171 is an apparatus, comprising means for identifying a first notification received via a Ve-Vnfm-Em interface, means for detecting, based on the first notification, a virtualized network function (VNF)-related virtualized resource (VR) performance alarm associated with one or more VRs supporting a VNF used to implement a virtualized network element in a 3rd Generation Partnership Project (3GPP) network, and means for sending a second notification to provide a network manager (NM) with notice of the VNF-related VR performance alarm.

Example 172 is the apparatus of Example 171, the first notification to be received from a virtualized network functions manager (VNFM).

Example 173 is the apparatus of any of Examples 171 to 172, the second notification to be sent to an integration reference point manager (IRPManager).

Example 174 is the apparatus of Example 173, the second notification to be sent to the IRPManager via an Itf-N interface.

Example 175 is the apparatus of any of Examples 171 to 174, the virtualized network element to comprise a virtualized evolved node B (veNB).

Example 176 is the apparatus of any of Examples 171 to 174, the virtualized network element to comprise a virtualized mobility management entity (vMME).

Example 177 is the apparatus of any of Examples 171 to 174, the virtualized network element to comprise a virtualized serving gateway (vSGW).

Example 178 is the apparatus of any of Examples 171 to 174, the virtualized network element to comprise a virtualized packet data network gateway (vPGW).

Example 179 is a system, comprising an apparatus according to any of Examples 171 to 178, and at least one network interface adapter.

Example 180 is an apparatus, comprising means for identifying a virtualized network function (VNF)-related virtualized resource (VR) performance data threshold, means for determining whether the VNF-related VR performance data threshold has been crossed based on received VNF-related VR performance data, and means for, in response to a determination that the VNF-related VR performance data threshold has been crossed, sending a VNF-related VR performance alarm notification to an element manager (EM).

Example 181 is the apparatus of Example 180, comprising means for sending the VNF-related VR performance alarm notification to the EM via a Ve-Vnfm-Em reference point.

Example 182 is the apparatus of any of Examples 180 to 181, the VNF-related VR performance data to be received via a Vi-Vnfm reference point.

Example 183 is the apparatus of any of Examples 180 to 182, the VNF-related VR performance data to be received from a virtualized infrastructure manager (VIM).

Example 184 is the apparatus of Example 183, comprising means for sending a message to the VIM to cause the VIM to collect the VNF-related VR performance data.

Example 185 is the apparatus of any of Examples 180 to 184, comprising means for sending the VNF-related VR performance alarm notification to the EM in response to a determination that the VNF-related VR performance data threshold has been reached.

Example 186 is a system, comprising an apparatus according to any of Examples 180 to 185, and at least one network interface adapter.

Example 187 is a method, comprising identifying a first notification received from a virtualized network functions manager (VNFM), detecting a virtualized network function (VNF)-related virtualized resource (VR) performance alarm based on the first notification, and sending a second notification to an integration reference point manager (IRPManager) to provide notice of the VNF-related VR performance alarm.

Example 188 is the method of Example 187, the first notification to be received from the VNFM via a Ve-Vnfm-Em reference point.

Example 189 is the method of any of Examples 187 to 188, the second notification to be sent to the IRPManager via an Itf-N reference point.

Example 190 is the method of any of Examples 187 to 189, the IRPManager to comprise a network manager (NM) entity.

Example 191 is at least one computer-readable storage medium comprising a set of instructions that, in response to being executed on a computing device, cause the computing device to perform a method according to any of Examples 187 to 190.

Example 192 is an apparatus, comprising means for performing a method according to any of Examples 187 to 190.

Example 193 is a system, comprising the apparatus of Example 192, and at least one network interface adapter.

Example 194 is an apparatus, comprising means for identifying a virtualized network function (VNF)-related virtualized resource (VR) performance data threshold associated with received virtualized resource (VR) performance measurement (PM) data, means for determining whether the VNF-related VR performance data threshold has been crossed based on the received VNF-related VR performance data, and means for, in response to a determination that the VNF-related VR performance data threshold has been crossed, sending a VNF-related VR performance alarm notification to a network manager (NM).

Example 195 is the apparatus of Example 194, comprising means for sending the VNF-related VR performance alarm notification to the NM via a Itf-N reference point.

Example 196 is the apparatus of any of Examples 194 to 195, the VNF-related VR performance data to be received via a Ve-Vnfm-Em reference point.

Example 197 is the apparatus of any of Examples 194 to 196, the VNF-related VR performance data to be received from a virtualized network functions manager (VNFM).

Example 198 is the apparatus of Example 197, comprising means for sending a message to the VNFM to cause the VNFM to provide the VNF-related VR performance data.

Example 199 is the apparatus of any of Examples 194 to 198, comprising means for sending the VNF-related VR performance alarm notification to the NM in response to a determination that the VNF-related VR performance data threshold has been reached.

Example 200 is a system, comprising an apparatus according to any of Examples 194 to 199, and at least one network interface adapter.

Example 201 is a method, comprising detecting a virtualized network function (VNF)-related virtualized resource (VR) performance alarm based on a notification received from an element manager (EM), based on the detected VNF-related VR performance alarm, determining that a VNF instance is to be restarted, and sending a VNF restart request to a network functions virtualization orchestrator (NFVO) to request that the VNF instance be restarted.

Example 202 is the method of Example 201, the notification to be received from the EM via an Itf-N reference point.

Example 203 is the method of any of Examples 201 to 202, the VNF restart request to be sent to the NFVO via an Os-Ma-Nfvo reference point.

Example 204 is the method of any of Examples 201 to 203, comprising acting as an Integration Reference Point Manager (IRPManager) to receive the first notification from the EM.

Example 205 is at least one computer-readable storage medium comprising a set of instructions that, in response to being executed on a computing device, cause the computing device to perform a method according to any of Examples 201 to 204.

Example 206 is an apparatus, comprising means for performing a method according to any of Examples 201 to 204.

Example 207 is a system, comprising the apparatus of Example 206, and at least one network interface adapter.

Example 208 is an apparatus, comprising processing circuitry, and computer-readable storage media having stored thereon instructions for execution by the processing circuitry to identify a virtualized network function (VNF)-related virtualized resource (VR) performance threshold for one or more VRs supporting a VNF used to implement a virtualized network element in a 3rd Generation Partnership Project (3GPP) network, determine whether the VNF-related VR performance threshold has been crossed based on received VNF-related VR performance data, and in response to a determination that the VNF-related VR performance threshold has been crossed, send a VNF-related VR performance alarm notification to an element manager (EM).

Example 209 is the apparatus of Example 208, the computer-readable storage media having stored thereon instructions for execution by the processing circuitry to send the VNF-related VR performance alarm notification to the EM via a Ve-Vnfm-Em reference point.

Example 210 is the apparatus of any of Examples 208 to 209, the VNF-related VR performance data to be received via a Vi-Vnfm reference point.

Example 211 is the apparatus of any of Examples 208 to 210, the computer-readable storage media having stored thereon instructions for execution by the processing circuitry to identify the VNF-related VR performance threshold based on a message received from the EM.

Example 212 is the apparatus of any of Examples 208 to 211, the computer-readable storage media having stored thereon instructions for execution by the processing circuitry to send the VNF-related VR performance alarm notification to the EM in response to a determination that the VNF-related VR performance threshold has been reached.

Example 213 is the apparatus of any of Examples 208 to 212, the VNF-related VR performance data to be received from a virtualized infrastructure manager (VIM).

Example 214 is the apparatus of Example 213, the computer-readable storage media having stored thereon instructions for execution by the processing circuitry to send a message to the VIM to cause the VIM to collect the VNF-related VR performance data.

Example 215 is the apparatus of Example 214, the computer-readable storage media having stored thereon instructions for execution by the processing circuitry to send the message to cause the VIM to collect the VNF-related VR performance data in response to a request received from the EM.

Example 216 is the apparatus of any of Examples 208 to 215, the virtualized network element to comprise a virtualized evolved node B (veNB).

Example 217 is the apparatus of any of Examples 208 to 215, the virtualized network element to comprise a virtualized mobility management entity (vMME).

Example 218 is the apparatus of any of Examples 208 to 215, the virtualized network element to comprise a virtualized serving gateway (vSGW).

Example 219 is the apparatus of any of Examples 208 to 215, the virtualized network element to comprise a virtualized packet data network gateway (vPGW).

Example 220 is a system, comprising an apparatus according to any of Examples 208 to 219, and at least one network interface adapter.

Example 221 is an apparatus, comprising means for identifying a virtualized network function (VNF)-related virtualized resource (VR) performance threshold for one or more VRs supporting a VNF used to implement a virtualized network element in a 3rd Generation Partnership Project (3GPP) network, means for determining whether the VNF-related VR performance threshold has been crossed or reached, and means for, in response to a determination that the VNF-related VR performance threshold has been crossed, sending a VNF-related VR performance alarm notification to an element manager (EM) via an Ve-Vnfm-Em interface.

Example 222 is the apparatus of Example 221, comprising means for identifying the VNF-related VR performance threshold based on a message received from the EM.

Example 223 is the apparatus of any of Examples 221 to 222, comprising means for determining whether the VNF-related VR performance threshold has been crossed based on received VNF-related VR performance data.

Example 224 is the apparatus of Example 223, the VNF-related VR performance data to be received via a Vi-Vnfm interface.

Example 225 is the apparatus of any of Examples 223 to 224, the VNF-related VR performance data to be received from a virtualized infrastructure manager (VIM).

Example 226 is the apparatus of Example 225, comprising means for sending a message to the VIM to cause the VIM to collect the VNF-related VR performance data.

Example 227 is the apparatus of Example 226, comprising means for sending the message to cause the VIM to collect the VNF-related VR performance data in response to a request received from the EM.

Example 228 is the apparatus of any of Examples 221 to 227, the virtualized network element to comprise a virtualized evolved node B (veNB).

Example 229 is the apparatus of any of Examples 221 to 227, the virtualized network element to comprise a virtualized mobility management entity (vMME).

Example 230 is the apparatus of any of Examples 221 to 227, the virtualized network element to comprise a virtualized serving gateway (vSGW).

Example 231 is the apparatus of any of Examples 221 to 227, the virtualized network element to comprise a virtualized packet data network gateway (vPGW).

Example 232 is a system, comprising an apparatus according to any of Examples 221 to 231, and at least one network interface adapter.

Example 233 is an apparatus, comprising means for identifying a first notification received from a virtualized network functions manager (VNFM), means for detecting, based on the first notification, a virtualized network function (VNF)-related virtualized resource (VR) performance alarm associated with one or more VRs supporting a VNF used to implement a virtualized network element in a 3rd Generation Partnership Project (3GPP) network, and means for sending a second notification to an integration reference point manager (IRPManager) to provide notice of the VNF-related VR performance alarm.

Example 234 is the apparatus of Example 233, the first notification to be received from the VNFM via a Ve-Vnfm-Em reference point.

Example 235 is the apparatus of any of Examples 233 to 234, the second notification to be sent to the IRPManager via an Itf-N reference point.

Example 236 is the apparatus of any of Examples 233 to 235, the IRPManager to comprise a network manager (NM) entity.

Example 237 is the apparatus of any of Examples 233 to 236, the virtualized network element to comprise a virtualized evolved node B (veNB).

Example 238 is the apparatus of any of Examples 233 to 236, the virtualized network element to comprise a virtualized mobility management entity (vMME).

Example 239 is the apparatus of any of Examples 233 to 236, the virtualized network element to comprise a virtualized serving gateway (vSGW).

Example 240 is the apparatus of any of Examples 233 to 236, the virtualized network element to comprise a virtualized packet data network gateway (vPGW).

Example 241 is a system, comprising an apparatus according to any of Examples 233 to 240, and at least one network interface adapter.

Example 242 is an apparatus, comprising processing circuitry, and computer-readable storage media having stored thereon instructions for execution by the processing circuitry to identify a first notification received via a Ve-Vnfm-Em interface, detect, based on the first notification, a virtualized network function (VNF)-related virtualized resource (VR) performance alarm associated with one or more VRs supporting a VNF used to implement a virtualized network element in a 3rd Generation Partnership Project (3GPP) network, and send a second notification to provide a network manager (NM) with notice of the VNF-related VR performance alarm.

Example 243 is the apparatus of Example 242, the first notification to be received from a virtualized network functions manager (VNFM).

Example 244 is the apparatus of any of Examples 242 to 243, the second notification to be sent to an integration reference point manager (IRPManager).

Example 245 is the apparatus of Example 244, the second notification to be sent to the IRPManager via an Itf-N interface.

Example 246 is the apparatus of any of Examples 242 to 245, the virtualized network element to comprise a virtualized evolved node B (veNB).

Example 247 is the apparatus of any of Examples 242 to 245, the virtualized network element to comprise a virtualized mobility management entity (vMME).

Example 248 is the apparatus of any of Examples 242 to 245, the virtualized network element to comprise a virtualized serving gateway (vSGW).

Example 249 is the apparatus of any of Examples 242 to 245, the virtualized network element to comprise a virtualized packet data network gateway (vPGW).

Example 250 is a system, comprising an apparatus according to any of Examples 242 to 249, and at least one network interface adapter.

Example 251 is an apparatus, comprising processing circuitry, and computer-readable storage media having stored thereon instructions for execution by the processing circuitry to identify a virtualized network function (VNF)-related virtualized resource (VR) performance data threshold, determine whether the VNF-related VR performance data threshold has been crossed based on received VNF-related VR performance data, and in response to a determination that the VNF-related VR performance data threshold has been crossed, send a VNF-related VR performance alarm notification to an element manager (EM).

Example 252 is the apparatus of Example 251, the computer-readable storage media having stored thereon instructions for execution by the processing circuitry to send the VNF-related VR performance alarm notification to the EM via a Ve-Vnfm-Em reference point.

Example 253 is the apparatus of any of Examples 251 to 252, the VNF-related VR performance data to be received via a Vi-Vnfm reference point.

Example 254 is the apparatus of any of Examples 251 to 253, the VNF-related VR performance data to be received from a virtualized infrastructure manager (VIM).

Example 255 is the apparatus of Example 254, the computer-readable storage media having stored thereon instructions for execution by the processing circuitry to send a message to the VIM to cause the VIM to collect the VNF-related VR performance data.

Example 256 is the apparatus of any of Examples 251 to 255, the computer-readable storage media having stored thereon instructions for execution by the processing circuitry to send the VNF-related VR performance alarm notification to the EM in response to a determination that the VNF-related VR performance data threshold has been reached.

Example 257 is a system, comprising an apparatus according to any of Examples 251 to 256, and at least one network interface adapter.

Example 258 is an apparatus, comprising means for identifying a first notification received from a virtualized network functions manager (VNFM), means for detecting a virtualized network function (VNF)-related virtualized resource (VR) performance alarm based on the first notification, and means for sending a second notification to an integration reference point manager (IRPManager) to provide notice of the VNF-related VR performance alarm.

Example 259 is the apparatus of Example 258, the first notification to be received from the VNFM via a Ve-Vnfm-Em reference point.

Example 260 is the apparatus of any of Examples 258 to 259, the second notification to be sent to the IRPManager via an Itf-N reference point.

Example 261 is the apparatus of any of Examples 258 to 260, the IRPManager to comprise a network manager (NM) entity.

Example 262 is a system, comprising an apparatus according to any of Examples 258 to 261, and at least one network interface adapter.

Example 263 is an apparatus, comprising processing circuitry, and computer-readable storage media having stored thereon instructions for execution by the processing circuitry to identify a virtualized network function (VNF)-related virtualized resource (VR) performance data threshold associated with received virtualized resource (VR) performance measurement (PM) data, determine whether the VNF-related VR performance data threshold has been crossed based on the received VNF-related VR performance data, and in response to a determination that the VNF-related VR performance data threshold has been crossed, send a VNF-related VR performance alarm notification to a network manager (NM).

Example 264 is the apparatus of Example 263, the computer-readable storage media having stored thereon instructions for execution by the processing circuitry to send the VNF-related VR performance alarm notification to the NM via a Itf-N reference point.

Example 265 is the apparatus of any of Examples 263 to 264, the VNF-related VR performance data to be received via a Ve-Vnfm-Em reference point.

Example 266 is the apparatus of any of Examples 263 to 265, the VNF-related VR performance data to be received from a virtualized network functions manager (VNFM).

Example 267 is the apparatus of Example 266, the computer-readable storage media having stored thereon instructions for execution by the processing circuitry to send a message to the VNFM to cause the VNFM to provide the VNF-related VR performance data.

Example 268 is the apparatus of any of Examples 263 to 267, the computer-readable storage media having stored thereon instructions for execution by the processing circuitry to send the VNF-related VR performance alarm notification to the NM in response to a determination that the VNF-related VR performance data threshold has been reached.

Example 269 is a system, comprising an apparatus according to any of Examples 263 to 268, and at least one network interface adapter.

Example 270 is an apparatus, comprising means for detecting a virtualized network function (VNF)-related virtualized resource (VR) performance alarm based on a notification received from an element manager (EM), means for, based on the detected VNF-related VR performance alarm, determining that a VNF instance is to be restarted, and means for sending a VNF restart request to a network functions virtualization orchestrator (NFVO) to request that the VNF instance be restarted.

Example 271 is the apparatus of Example 270, the notification to be received from the EM via an Itf-N reference point.

Example 272 is the apparatus of any of Examples 270 to 271, the VNF restart request to be sent to the NFVO via an Os-Ma-Nfvo reference point.

Example 273 is the apparatus of any of Examples 270 to 272, comprising means for acting as an Integration Reference Point Manager (IRPManager) to receive the first notification from the EM.

Example 274 is a system, comprising an apparatus according to any of Examples 270 to 273, and at least one network interface adapter.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. At least one computer-readable storage medium comprising a set of instructions that, in response to being executed on a computing device, cause the computing device to:
    identify a virtualized network function (VNF)-related virtualized resource (VR) performance threshold for one or more VRs supporting a VNF used to implement a virtualized network element in a 3rd Generation Partnership Project (3GPP) network;
    determine whether the VNF-related VR performance threshold has been crossed based on received VNF-related VR performance data;
    in response to a determination that the VNF-related VR performance threshold has been crossed, send a VNF-related VR performance alarm notification to an element manager (EM);
    in response to receipt of the VNF-related VR performance alarm notification at the EM, send a notification of the VNF-related VR performance notification to a network manager (NM);
    perform an alarm correlation procedure for determining whether to restart a VNF instance that checks for one or more correlations between a virtual resource performance alarm of a virtual resource in the VNF and one or more other pending virtual resource performance alarms of other virtual resources associated with a different virtual network element than a virtual network element associated with the virtual resource performance alarm, wherein the different virtual network element comprises at least one of: a virtualized evolved Node B (veNB) or a virtualized mobility management entity (vMME);
    determine whether the VNF instance is to be restarted based on the alarm correlation procedure.

2. The at least one computer-readable storage medium of claim 1, comprising instructions that, in response to being executed on the computing device, cause the computing device to send the VNF-related VR performance alarm notification to the EM via a Ve-Vnfm-Em reference point.

3. The at least one computer-readable storage medium of claim 1, the VNF-related VR performance data to be received via a Vi-Vnfm reference point.

4. The at least one computer-readable storage medium of claim 1, comprising instructions that, in response to being executed on the computing device, cause the computing device to identify the VNF-related VR performance threshold based on a message received from the EM.

5. The at least one computer-readable storage medium of claim 1, comprising instructions that, in response to being executed on the computing device, cause the computing device to send the VNF-related VR performance alarm notification to the EM in response to a determination that the VNF-related VR performance threshold has been reached.

6. The at least one computer-readable storage medium of claim 1, the VNF-related VR performance data to be received from a virtualized infrastructure manager (VIM).

7. The at least one computer-readable storage medium of claim 1, comprising instructions that, in response to determining that the VNF instance be restarted, sending a VNF restart request that the VNF instance be restarted to a virtualized network functions manager (VNFM) via a Ve-Vnfm-EM interface or a network function virtualization orchestrator (NFVO) via an OS-Ma-Nfvo reference point.

8. The at least one computer-readable storage medium of claim 1, comprising instructions that determine whether to restart the VNF instance based on whether the one or more correlations detected in the alarm correlation procedure relate to same virtualized resources at the at least one of: the veNB or the vMME and the virtual network element associated with the virtual resource performance alarm.

9. An apparatus,
    comprising: processing circuitry; and
    computer-readable storage media having stored thereon instructions for execution by the processing circuitry to:
        identify a virtualized network function (VNF)-related virtualized resource (VR) performance threshold for one or more VRs supporting a VNF used to implement a virtualized network element in a 3rd Generation Partnership Project (3GPP) network;
        determine whether the VNF-related VR performance threshold has been crossed or reached;
        in response to a determination that the VNF-related VR performance threshold has been crossed, send a VNF-related VR performance alarm notification to an element manager (EM) via an Ve-Vnfm-Em interface;
        in response to receipt of the VNF-related VR performance alarm notification at the EM, send a notification of the VNF-related VR performance notification to a network manager (NM);
        perform an alarm correlation procedure for determining whether to restart a VNF instance that checks for one or more correlations between a virtual resource performance alarm of a virtual resource in the VNF and one or more other pending virtual resource performance alarms of other virtual resources associated with a different virtual network element than a virtual network element associated with the virtual resource performance alarm, wherein the different virtual network element comprises at least one of: a virtualized evolved Node B (veNB) or a virtualized mobility management entity (vMME); and
    determine whether the VNF instance is to be restarted based on the alarm correlation procedure.

10. The apparatus of claim 9, the computer-readable storage media having stored thereon instructions for execution by the processing circuitry to identify the VNF-related VR performance threshold based on a message received from the EM.

11. The apparatus of claim 9, the computer-readable storage media having stored thereon instructions for execution by the processing circuitry to determine whether the VNF-related VR performance threshold has been crossed based on received VNF-related VR performance data.

12. The apparatus of claim 11, the VNF-related VR performance data to be received via a Vi-Vnfm interface.

13. The apparatus of claim 11, the VNF-related VR performance data to be received from a virtualized infrastructure manager (VIM).

14. The apparatus of claim 13, the computer-readable storage media having stored thereon instructions for execution by the processing circuitry to send a message to the VIM to cause the VIM to collect the VNF-related VR performance data.

15. The apparatus of claim 9, the virtualized network element to comprise a virtualized evolved node B (veNB).

16. The apparatus of claim 9, the virtualized network element to comprise a virtualized mobility management entity (vMME), a virtualized serving gateway (vSGW), or a virtualized packet data network gateway (vPGW).

17. An apparatus, comprising:
    processing circuitry; and
    computer-readable storage media having stored thereon instructions for execution by the processing circuitry to:
        identify a first notification received from a virtualized network functions manager (VNFM);
        detect, based on the first notification, a virtualized network function (VNF)-related virtualized resource (VR) performance alarm associated with one or more VRs supporting a VNF used to implement a virtualized network element in a 3rd Generation Partnership Project (3GPP) network;
        send a second notification to an integration reference point manager (IRPManager) to provide notice of the VNF-related VR performance alarm;
        perform an alarm correlation procedure for determining whether to restart a VNF instance that checks for one or more correlations between a virtual resource performance alarm of a virtual resource in the VNF and one or more other pending virtual resource performance alarms of other virtual resources associated with a different virtual network element than a virtual network element associated with the virtual resource performance alarm, wherein the different virtual network element comprises at least one of: a virtualized evolved Node B (veNB) or a virtualized mobility management entity (vMME); and
        determine whether the VNF instance is to be restarted based on the alarm correlation procedure.

18. The apparatus of claim 17, the first notification to be received from the VNFM via a Ve-Vnfm-Em reference point.

19. The apparatus of claim 17, the second notification to be sent to the IRPManager via an ltf-N reference point.

20. The apparatus of claim 17, the IRPManager to comprise a network manager (NM) entity.

21. The apparatus of claim 17, the virtualized network element to comprise a virtualized evolved node B (veNB), a virtualized mobility management entity (vMME), a virtualized serving gateway (vSGW), or a virtualized packet data network gateway (vPGW).

22. At least one computer-readable storage medium comprising a set of instructions that, in response to being executed on a computing device, cause the computing device to:
    identify a first notification received via a Ve-Vnfm-Em interface;
detect, based on the first notification, a virtualized network function (VNF)-related virtualized resource (VR) performance alarm associated with one or more VRs supporting a VNF used to implement a virtualized network element in a 3rd Generation Partnership Project (3GPP) network;
    send a second notification to provide a network manager (NM) with notice of the VNF-related VR performance alarm, the second notification to be sent to an integration reference point manager (IRPManager);
    perform an alarm correlation procedure for determining whether to restart a VNF instance that checks for one or more correlations between a virtual resource performance alarm of a virtual resource in the VNF and one or more other pending virtual resource performance alarms of other virtual resources associated with a different virtual network element than a virtual network element associated with the virtual resource performance alarm, wherein the different virtual network element comprises at least one of: a virtualized evolved Node B (veNB) or a virtualized mobility management entity (vMME); and
    determine whether the VNF instance is to be restarted based on the alarm correlation procedure.

23. The at least one computer-readable storage medium of claim 22, the first notification to be received from a virtualized network functions manager (VNFM).

24. The at least one computer-readable storage medium of claim 22, the virtualized network element to comprise a virtualized evolved node B (veNB), a virtualized mobility management entity (vMME), a virtualized serving gateway (vSGW), or a virtualized packet data network gateway (vPGW).

* * * * *